US011967177B2

(12) United States Patent
Doh

(10) Patent No.: US 11,967,177 B2
(45) Date of Patent: Apr. 23, 2024

(54) METHOD FOR MANAGING ITEM RECOMMENDATION USING DEGREE OF ASSOCIATION BETWEEN LANGUAGE UNIT AND USAGE HISTORY

(71) Applicant: MYCELEBS CO., LTD., Seoul (KR)

(72) Inventor: Jun Woong Doh, Seoul (KR)

(73) Assignee: MYCELEBS CO., LTD., Seoul (KR)

( * ) Notice: Subject to any disclaimer, the term of this patent is extended or adjusted under 35 U.S.C. 154(b) by 0 days.

(21) Appl. No.: 17/534,265

(22) Filed: Nov. 23, 2021

(65) Prior Publication Data
US 2023/0419720 A1  Dec. 28, 2023

Related U.S. Application Data

(63) Continuation of application No. 16/859,536, filed on Apr. 27, 2020, now abandoned.

(51) Int. Cl.
| | |
|---|---|
| *G06V 40/16* | (2022.01) |
| *G06N 3/08* | (2023.01) |
| *G06V 10/28* | (2022.01) |
| *G06V 10/44* | (2022.01) |
| *G06V 10/764* | (2022.01) |
| *G06V 10/82* | (2022.01) |

(52) U.S. Cl.
CPC ............ *G06V 40/168* (2022.01); *G06N 3/08* (2013.01); *G06V 10/28* (2022.01); *G06V 10/454* (2022.01); *G06V 10/764* (2022.01); *G06V 10/82* (2022.01)

(58) Field of Classification Search
CPC .... G06V 40/168; G06V 10/28; G06V 10/454; G06V 10/764; G06V 10/82; G06N 3/08
USPC ......................................................... 382/118
See application file for complete search history.

(56) References Cited

U.S. PATENT DOCUMENTS

| | | | |
|---|---|---|---|
| 9,864,901 B2 * | 1/2018 | Chang ................. | G06F 18/2413 |
| 2017/0061328 A1 * | 3/2017 | Majumdar .......... | G06V 10/454 |

* cited by examiner

*Primary Examiner* — Neil R McLean
(74) *Attorney, Agent, or Firm* — Nath, Goldberg & Meyer; Jerald L. Meyer; Stanley N. Protigal

(57) ABSTRACT

Disclosed herein is a method for managing item recommendation using a degree of association between language units and usage history to manage recommendation of similar items with high probability of purchase, rather than a matching method expressed by keywords, recommendation management, by adding or deleting experience items using a vector model-based reasoning method based on a word-to-word association, in a scheme of planning a novel recognition system through the study of human emotions and tastes, T.P.O (Time, Place, Occasion) and various list-specific characteristics (color, texture, etc.) based on the language used in everyday life in consideration of language units and items preferred or experienced and/or purchased by a user, and of applying machine learning technology and natural language understanding technology.

8 Claims, 37 Drawing Sheets

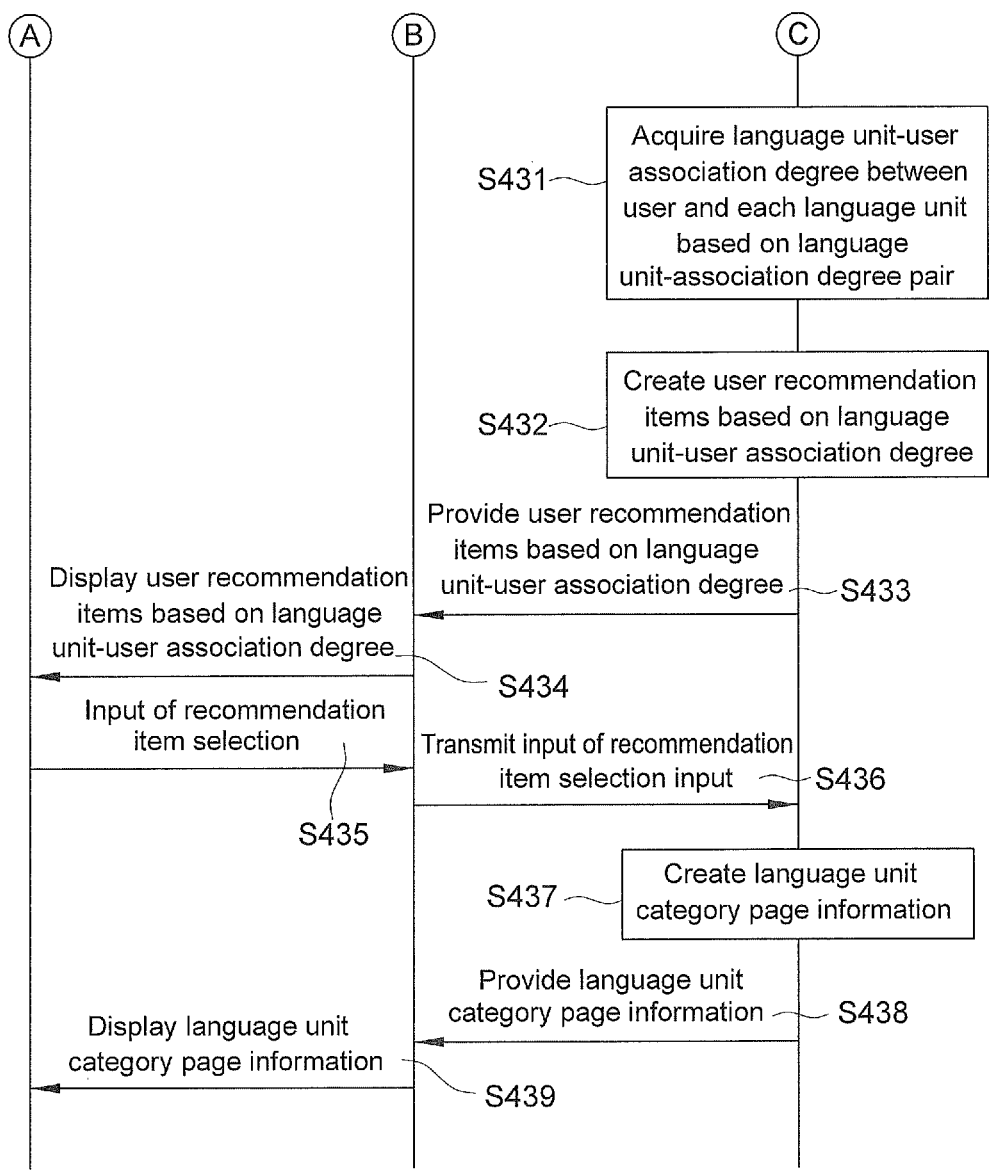

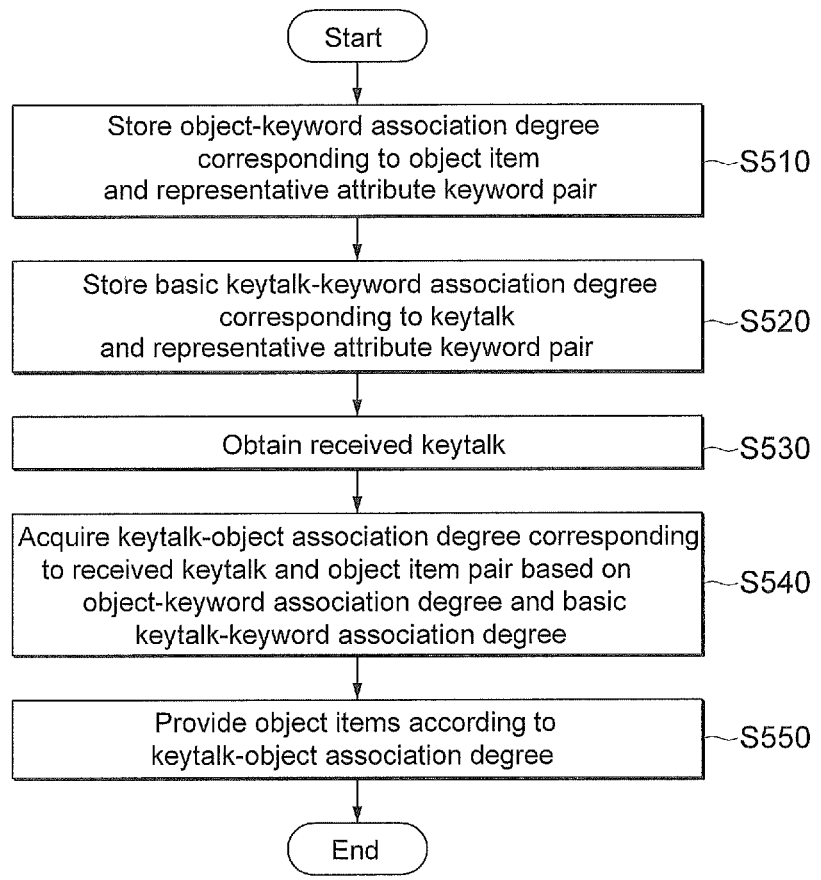

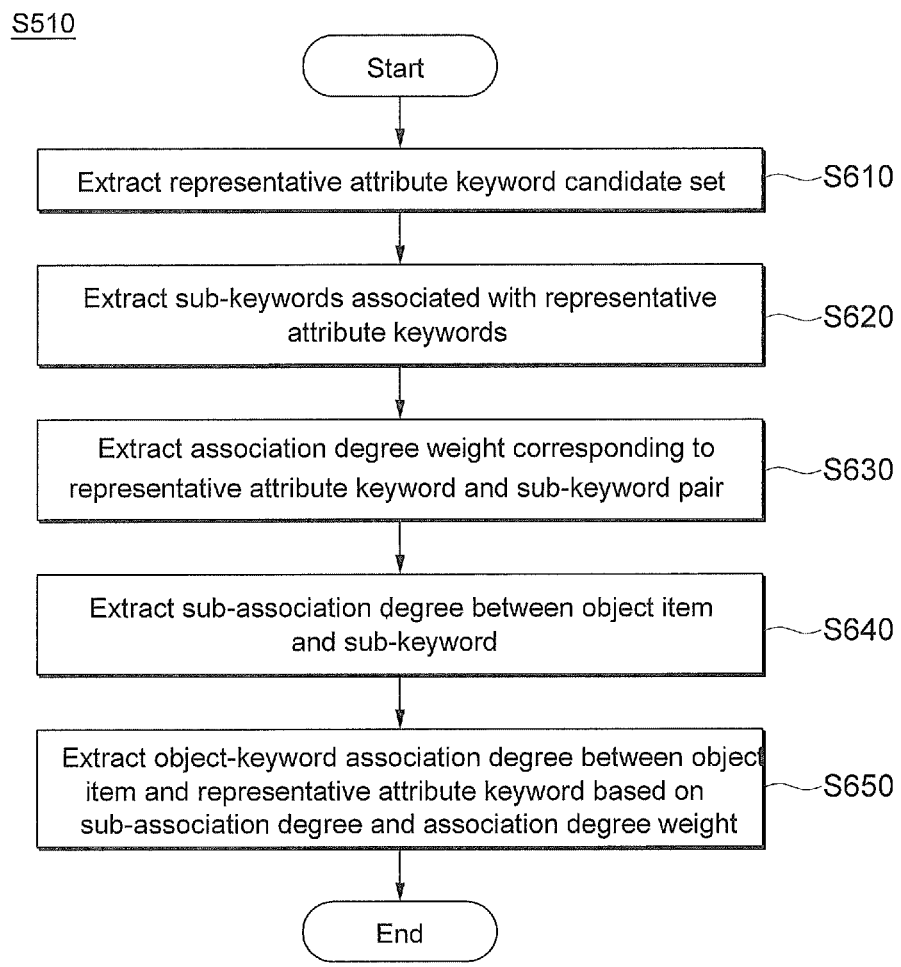

FIG. 10

|  | $k_1$ | $k_2$ | $k_3$ | $k_4$ | $k_5$ | $k_6$ | ... | $k_n$ |
|---|---|---|---|---|---|---|---|---|
| $i_1$ | $w_{1,1}$ | $w_{1,2}$ | $w_{1,3}$ | $w_{1,4}$ | $w_{1,5}$ | $w_{1,6}$ | ... | $w_{1,n}$ |
| $i_2$ | $w_{2,1}$ | $w_{2,2}$ | $w_{2,3}$ | $w_{2,4}$ | $w_{2,5}$ | $w_{2,6}$ | ... | $w_{2,n}$ |
| $i_3$ | $w_{3,1}$ | $w_{3,2}$ | $w_{3,3}$ | $w_{3,4}$ | $w_{3,5}$ | $w_{3,6}$ | ... | $w_{3,n}$ |
| $i_4$ | $w_{4,1}$ | $w_{4,2}$ | $w_{4,3}$ | $w_{4,4}$ | $w_{4,5}$ | $w_{4,6}$ | ... | $w_{4,n}$ |
| $i_5$ | $w_{5,1}$ | $w_{5,2}$ | $w_{5,3}$ | $w_{5,4}$ | $w_{5,5}$ | $w_{5,6}$ | ... | $w_{5,n}$ |
| $i_6$ | $w_{6,1}$ | $w_{6,2}$ | $w_{6,3}$ | $w_{6,4}$ | $w_{6,5}$ | $w_{6,6}$ | ... | $w_{6,n}$ |
| ... | ... | ... | ... | ... | ... | ... | ... | ... |
| $i_m$ | $w_{m,1}$ | $w_{m,2}$ | $w_{m,3}$ | $w_{m,4}$ | $w_{m,5}$ | $w_{m,6}$ | ... | $w_{m,n}$ |

FIG. 11

|  | $C_1$ | $C_2$ | $C_3$ | $C_4$ | $C_5$ | $C_6$ | ... | $C_q$ |
|---|---|---|---|---|---|---|---|---|
| $k_1$ | $V_{1,1}$ | $V_{1,2}$ | $V_{1,3}$ | $V_{1,4}$ | $V_{1,5}$ | $V_{1,6}$ | ... | $V_{1,q}$ |
| $k_2$ | $V_{2,1}$ | $V_{2,2}$ | $V_{2,3}$ | $V_{2,4}$ | $V_{2,5}$ | $V_{2,6}$ | ... | $V_{2,q}$ |
| $k_3$ | $V_{3,1}$ | $V_{3,2}$ | $V_{3,3}$ | $V_{3,4}$ | $V_{3,5}$ | $V_{3,6}$ | ... | $V_{3,q}$ |
| $k_4$ | $V_{4,1}$ | $V_{4,2}$ | $V_{4,3}$ | $V_{4,4}$ | $V_{4,5}$ | $V_{4,6}$ | ... | $V_{4,q}$ |
| $k_5$ | $V_{5,1}$ | $V_{5,2}$ | $V_{5,3}$ | $V_{5,4}$ | $V_{5,5}$ | $V_{5,6}$ | ... | $V_{5,q}$ |
| $k_6$ | $V_{6,1}$ | $V_{6,2}$ | $V_{6,3}$ | $V_{6,4}$ | $V_{6,5}$ | $V_{6,6}$ | ... | $V_{6,q}$ |
| ... | ... | ... | ... | ... | ... | ... | ... | ... |
| $k_n$ | $V_{n,1}$ | $V_{n,2}$ | $V_{n,3}$ | $V_{n,4}$ | $V_{n,5}$ | $V_{n,6}$ | ... | $V_{n,q}$ |

FIG. 21

Major keytalk for each list

| user's response | atmosphere | genre characteristics |
|---|---|---|
| playing | adorable | complex |
| funny | nostalgic | fiery |
| title | ordinary | neat |
| | | thriving |
| fire | fierce | special |
| | suspenseful | comedian |
| appealing | glamorous | physical comedy |
| funny | warm | cast members |
| cast | | talented singer |
| | | charming |
| | | dramatic |
| | | inspired |

FIG. 22

Analyze related keytalk

Major keytalk for each list

Select keytalk

| Cast | Atmosphere | User's response | Genre Characteristics |
|---|---|---|---|
| pretty | nostalgic | miss | hardworking |
| cute | adorable | grateful | constructed |
| brightly smiling | exciting | crazy | high quality |
| refreshing | fierce | good | powerful |
| innocent | suspenseful | memorable | neat |
| interested in everything | artistic | happy | flowing |
| inspired | ordinary | loving | rising |

FIG. 30

METHOD FOR MANAGING ITEM RECOMMENDATION USING DEGREE OF ASSOCIATION BETWEEN LANGUAGE UNIT AND USAGE HISTORY

CROSS-REFERENCE TO RELATED APPLICATION

This application is a continuation of U.S. patent application Ser. No. 16/859,536, filed Apr. 27, 2020 which claims priority under 35 U.S.C. § 119 to Korean Patent Application No. 10-2019-0048575, filed on Apr. 25, 2019, in the Korean Intellectual Property Office (KIPO), the disclosure of which is incorporated by reference herein in its entirety.

TECHNICAL FIELD

The present disclosure relates to a method for managing item recommendation using a degree of association between language units and usage history, and more particularly, to a method for managing item recommendation using a degree of association between language units and usage history, rather than a matching method simply expressed by keywords, to manage and recommend similar items having high probability of purchase by adding or deleting experience items through a vector model-based reasoning scheme based on a word-to-word association, in consideration of language units and items preferred or experienced and/or purchased by a user, which is enabled by implementing a novel recognition system and applying machine learning technology and natural language comprehension technology through the study of human emotions and tastes, T.P.O (Time, Place, Occasion) and various list-specific characteristics (color, texture, etc.) based on the language used in everyday life.

DISCUSSION OF RELATED ART

In general, modern information users (web users, hereinafter collectively referred to as "users") should select information they want in an environment where large amounts of and various types of information are provided simultaneously. In addition, the information required by the user has a variety of formats according to the source of the information, and thus a more intelligent and automated system is required for comprehensive analysis and utilization.

In order to satisfy these requirements, a system that analyzes and recommends search patterns of users is utilized.

A typical application of the study on the search pattern of users is to analyze, on the server side, session data of users accessing their server and to utilize it for advertisement or custom web page generation.

The result of this analysis, along with collaborative filtering technique, is recognized as one of the most important management strategies for companies whose users are the main customers. That is, search results (e.g., search page, search time, search order, transaction trend, etc.) of users recorded on the server are used as one of the main sources of creating added value. The analyzed data is used to infer a web page that a user will visit later or to guess a product of interest, and ultimately, the application is made to recommend products suitable for the characteristics of the user, having a high probability of purchase. In addition, attempts have been largely made to analyze a user's search pattern on the client side in the form of a proxy server or plug-in, which is advantageous in that more information may be utilized than analysis on the server side.

However, there is a problem in that the existing user preference analysis system and the recommendation service may not utilize various information and may not overcome the limitations of using only the given information in their respective areas.

Accordingly, it is necessary to manage and recommend similar items having high probability of purchase by using a vector model-based reasoning scheme based on a word-to-word association in consideration of a user's preference, experience, and/or purchase history.

SUMMARY

Embodiments of the present disclosure may be directed to a method for managing item recommendation using a degree of association between language units and usage history to manage recommendation of similar items having high probability of purchase, by adding or deleting experience items using a vector model-based reasoning scheme based on a word-to-word association, in consideration of user's history of preference, experience, and/or purchase.

According to an embodiment, a method for managing item recommendation based on a degree of association between language units and usage history by using an apparatus of managing item recommendation includes setting a degree of association between language units and items by a controller of the apparatus of managing item recommendation; generating, by the controller of the apparatus of managing item recommendation, item selection interface page information for editing an experience item list including experience items; transmitting, by a communication unit of the apparatus of managing item recommendation, the item selection interface page information to a terminal; receiving, from the terminal, by the communication unit of the apparatus of managing item recommendation, item selection input information through which an input of item selection from the experience item list is identifiable; obtaining, by the controller of the apparatus of managing item recommendation, a language unit-association degree pair with respect to a threshold value, in association with each experience item in the experience item list; obtaining, by the controller of the apparatus of managing item recommendation, a language unit-list association degree between the experience item list and each language unit, based on the language unit-association degree pair corresponding to the experience item list; generating, by the controller of the apparatus of managing item recommendation, a recommendation item list based on the language unit-list association degree; transmitting the recommendation item list to the terminal by the communication unit of the apparatus of managing item recommendation; generating, by the controller of the apparatus of managing item recommendation, language unit category page information that displays, for each language unit category, language units in descending order of the language unit-list association degree with respect to a threshold value, in relation to the experience item list; and transmitting the language unit category page information to the terminal by the communication unit of the apparatus of managing item recommendation.

BRIEF DESCRIPTION OF THE DRAWINGS

A more complete appreciation of the present disclosure will become more apparent by describing in detail embodiments thereof with reference to the accompanying drawings, wherein:

FIGS. 4A to 4C are flowcharts illustrating a process of managing item recommendation through an item recommendation management interface according to an embodiment.

FIG. 5 is a flowchart illustrating a process of managing item recommendation according to an embodiment.

FIG. 6 is a detailed flowchart illustrating some steps of FIG. 5;

FIG. 10 is an exemplary diagram illustrating a degree of stored object-keyword association according to an embodiment.

FIG. 11 is an exemplary diagram illustrating a degree of basic language unit-keyword association according to an embodiment.

FIG. 21 is an exemplary view illustrating major language units for each language unit list based on a language unit associated with a selected item according to an embodiment.

FIG. 22 is an exemplary view illustrating major language units for each language unit list based on a language unit associated with a selected item according to another embodiment.

FIG. 30 is an exemplary view illustrating an entire language unit adjustment interface corresponding to a clicked list according to an embodiment.

DETAILED DESCRIPTION

Figure 1:
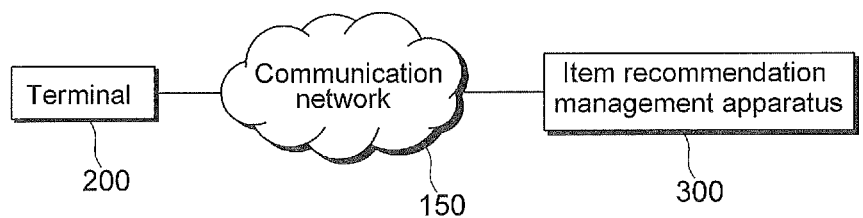
FIG. 1 is a schematic overall configuration block diagram illustrating a system of managing item recommendation by using a degree of association between language units and usage history according to an embodiment.

Hereinafter, a method for managing item recommendation using a degree of association between language units and usage history according to the present disclosure will be described in more detail through detailed description of embodiments with reference to the drawings. In the description of the present disclosure, when it is determined that a detailed description of related known technologies or configurations may unnecessarily obscure the subject matter of the present disclosure, the detailed description will be omitted. In addition, terms to be described below are terms defined in consideration of functions in the present disclosure, which may vary according to a client or operator, a user's intention, or a custom. Therefore, the definition should be made based on the context of the present disclosure.

Like reference numerals refer to like elements throughout the drawings. The embodiments of the present disclosure are described in detail below with reference to the accompanying drawings.

FIG. 1 is a schematic overall configuration block diagram illustrating a system of managing item recommendation using a degree of association between language units and usage history according to an embodiment.

Referring to FIG. 1, the system of managing item recommendation using a degree of association between language units and usage history according to an embodiment may include a communication network 150, a terminal 200, and an item recommendation management apparatus 300.

In such a case, the terminal 200 may be implemented as, for example, a smartphone, a PDA, a tablet PC, a notebook computer, a laptop computer, a personal computer, another electronic apparatus capable of performing communication, receiving input from a user, and outputting screens, or a similar apparatus.

The item recommendation management apparatus 300 may be implemented as, for example, a workstation, a server, a general-purpose computer, another electronic apparatus capable of performing communication, or a similar apparatus.

The terminal 200 and the item recommendation management apparatus 300 are connected to and communicate with each other over the communication network 150.

The communication network 150 may be implemented using at least part of Long Term Evolution (LTE), LTE-Advanced (LTE-A), WI-FI, Local Area Network (LAN), Wide Area Network (WAN), Code Division Multiple Access (CDMA), Time Division Multiple Access (TDMA), Wireless Broadband (WiBro), and Global System for Mobile Communications (GSM), and other communication methods developed in the past, being currently developed, and to be developed in the future. In the following, for the sake of convenience, the terminal 200 and the item recommendation management apparatus 300 will be described as directly communicating with each other without references to the communication network 150.

The detailed operations and configurations of the terminal 200 and the item recommendation management apparatus 300 will be described with reference to FIGS. 2 to 8.

Figure 2:
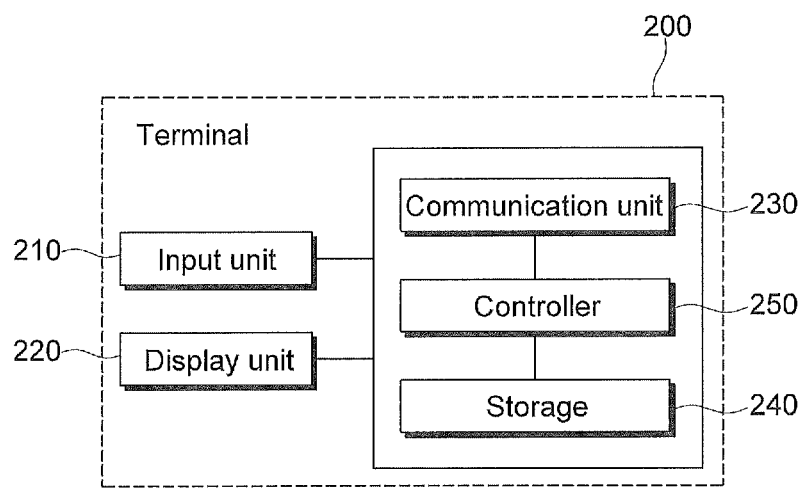
FIG. 2 is a block diagram illustrating a terminal illustrated in FIG. 1.

FIG. 2 is a block diagram illustrating the terminal 200 according to an embodiment.

Referring to FIG. 2, the terminal 200 according to an embodiment may include an input unit 210, a display unit 220, a communication unit 230, a storage 240, and a controller 250.

The input unit 210 converts an input operation of a user into an input signal, and transmits the input signal to the controller 250. The input unit 210 may be implemented as, for example, a keyboard, a mouse, a touch sensor on a touch screen, a touchpad, a keypad, a voice input apparatus, or another input processing apparatus developed in the past, being currently developed, or to be developed in the future. For example, the input unit 210 may receive an item recommendation management request input from a user, and may transmit the item recommendation management request input to the controller 250.

The display unit 220 outputs a screen under the control of the controller 250. The display unit 220 may be implemented as, for example, a liquid crystal display (LCD) apparatus, a light-emitting diode (LED) apparatus, an organic LED (OLED) apparatus, a projector, or another display apparatus developed in the past, being currently developed, or to be developed in the future. For example, the display unit 220 may display an interface page for item recommendation management or a result page for the item recommendation management.

In an embodiment, a configuration using another scheme for transmitting information to a user, such as voice output or vibration, rather than screen output, may be used in place of the display unit 220.

The communication unit 230 exchanges data with the item recommendation management apparatus 300 and/or other external apparatuses. The communication unit 230 transmits data, received from the item recommendation management apparatus 300, to the controller 250. In addition, the communication unit 230 transmits data to the item recommendation management apparatus 300 under the control of the controller 250. The communication technology used by the communication unit 230 may vary depending on the type of communication network 150 or other circumstances.

The storage 240 stores data under the control of the controller 250, and transmits requested data to the controller 250.

The controller 250 controls the overall operation of the terminal 200 and individual components. In particular, the controller 250 transmits an item recommendation management request or another type of data to the item recommendation management apparatus 300 according to information input from the input unit 210, and displays a result page and/or an interface page via the display unit 220 according to page information received from the item recommendation management apparatus 300, as will be described below. The operation performed by the controller 250 may be distributed and processed by a plurality of arithmetic and logic units which are physically distributed. There is possible a method in which part of the operation performed by the controller 250 is performed by a first server and the remaining operation is performed by a second server. In this case, the controller 250 may be implemented as the sum of the arithmetic and logic units which are physically distributed.

The storage 240 may be implemented as the sum of storage apparatuses which are physically separated from each other.

When the controller 250 or storage 240 is implemented as the sum of a plurality of apparatuses which are physically separated from each other, communication is required between the plurality of apparatuses. In this case, for the sake of simplicity of description, the following description will be given on the assumption that the storage 240 or controller 250 is implemented as a single object.

In the case where the terminal 200 transmits or receives data, the communication unit 230 may be described as transmitting or receiving data under the control of the controller 250, or the controller 250 may be described as transmitting or receiving data by controlling the communication unit 230, depending on the point of view of a corresponding situation.

The detailed operations of the individual components of the terminal 200 will be described with reference to FIGS. 4 to 8.

Figure 3:
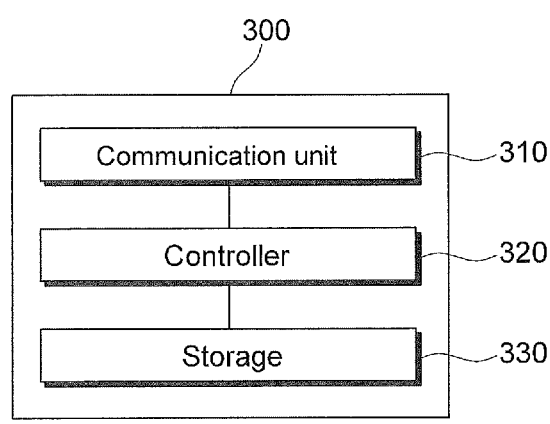
FIG. 3 is a configuration block diagram illustrating an apparatus of managing item recommendation illustrated in FIG. 1.

FIG. 3 is a block diagram illustrating an item recommendation management apparatus 300 according to an embodiment.

Referring to FIG. 3, the item recommendation management apparatus 300 according to an embodiment may include a communication unit 310, a controller 320, and a storage 330.

The communication unit 310 exchanges data with the terminal 200 and/or other external apparatuses. The communication unit 310 transmits data, received from the terminal 200, to the controller 320. In addition, the communication unit 310 transmits data to the terminal 200 under the control of the controller 320. The communication technology used by the communication unit 310 may vary depending on the type of communication network 150 or other circumstances.

The storage 330 stores data under the control of the controller 320, and transmits data, requested by the controller 320, to the controller 320.

The controller 320 controls the overall operation of the item recommendation management apparatus 300 and individual components. In particular, when the controller 320 receives an interface page request, an information provision result page request, or another type of data via the communication unit 310, the controller 320 retrieves required data from storage 330, generates load page information, and transmits page information to the terminal 200 via the communication unit 310, as will be described below.

In the case where the item recommendation management apparatus 300 transmits or receives data, the communication unit 310 may be described as transmitting or receiving data under the control of the controller 320, or the controller 320 may be described as transmitting or receiving data by controlling the communication unit 310, depending on the point of view of a corresponding situation.

The detailed operations of the individual components of the item recommendation management apparatus 300 will be described with reference to FIGS. 4a to 8.

Figure 4A:
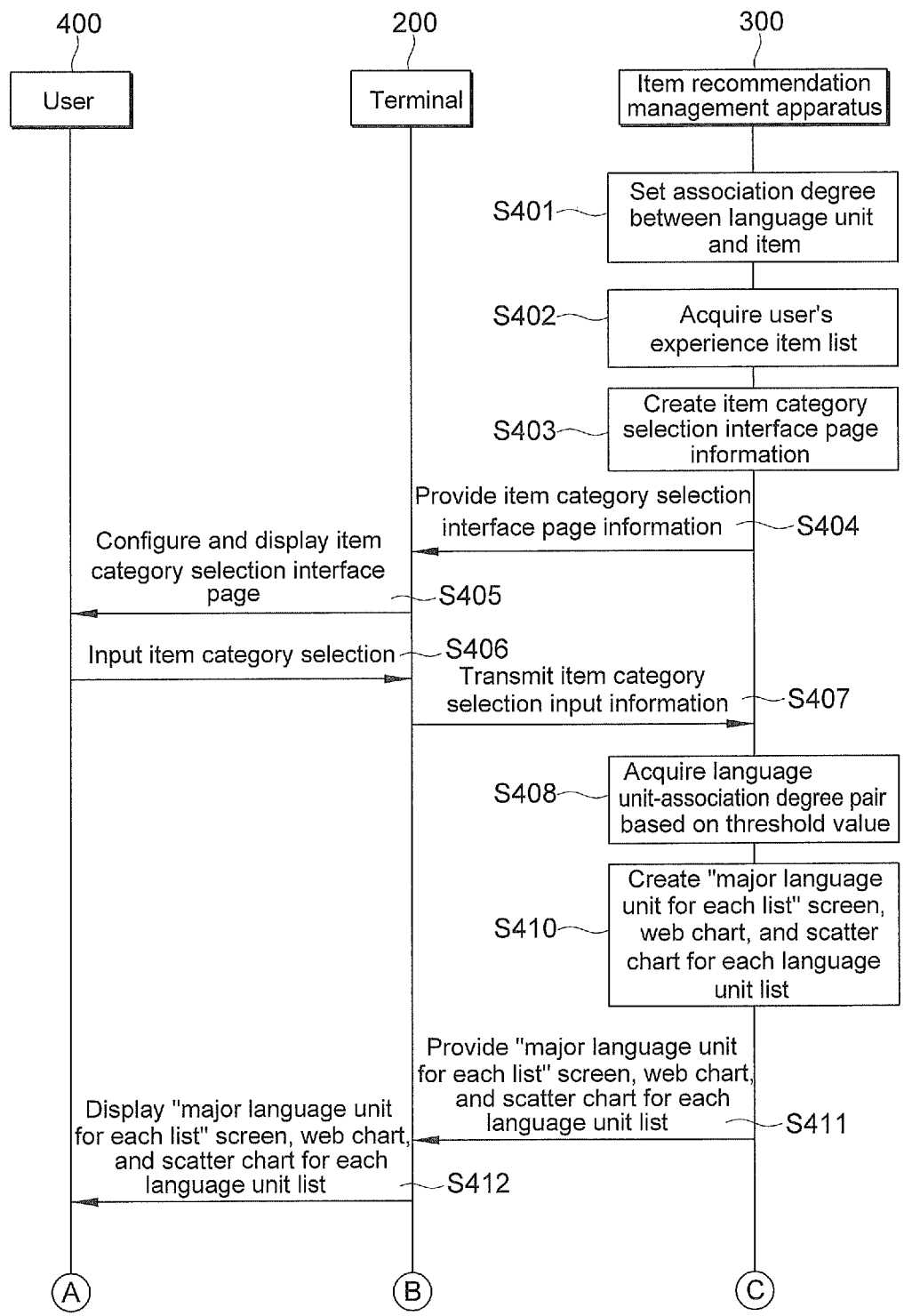
Figure 4B:
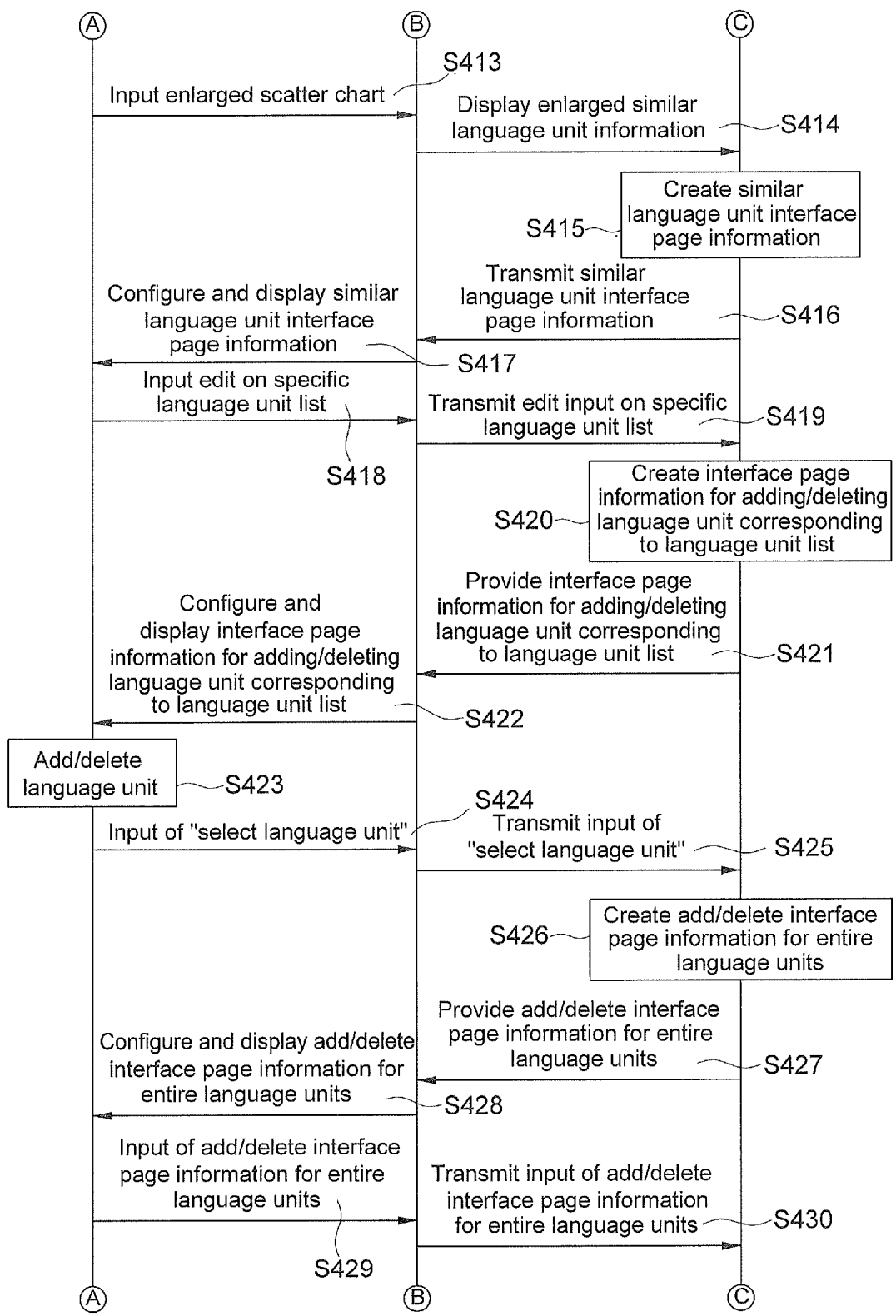

FIGS. 4A to 4C are flowcharts illustrating a process of managing item recommendation through an item recommendation management interface according to an embodiment.

Referring to FIGS. 4A to 4C, a process of managing item recommendation through an item recommendation management interface is as follows.

First, in step S401, a degree of association between language units and items is set by the controller 320 of the item recommendation management apparatus 300. This process may be performed by a method described below with reference to FIGS. 5 to 9 or may be set by an administrator or may be set in other ways.

Then, in step S402, an experience item list including user's experience items is obtained by the controller 320 of the item recommendation management apparatus 300. In such a case, the experience item may be, for example, purchase history of a corresponding product, preference indication (e.g., "Like"), or visit record (e.g., a picture held by the terminal, a picture uploaded by the user, or analysis on location information of the terminal, etc.), and selection/retrieval records, and may be limited according to item categories (destinations/movies/broadcasting programs). In addition, in some embodiments, the experience item may be limited to a period within a certain period from the present to the past.

Steps S403 to S407 below may be omitted when only one item category is serviced.

Then, in S403, the controller 320 of the item recommendation management apparatus 300 generates item selection interface page information including a language unit list together with the experience items. In such a case, the item selection interface page information is information required to generate an item selection interface page. The item selection interface page is a page for inducing a user's input, receiving the user's input, and transmitting it to the item recommendation management apparatus 300. For example, the item selection interface page information may be in the form of an HTML document or other markup language document. In addition, in some embodiments, the terminal 200 may have the format information of the item selection interface page in advance, and only the item corresponding to the contents may be transmitted from the item recommendation management apparatus 300 to the terminal 200. Hereinafter, for the sake of convenience, it is assumed and described that interface page information or other page information is transmitted in the form of an HTML document. However, embodiments are not limited thereto.

Then, in step S404, the communication unit 310 of the item recommendation management apparatus 300 transmits the item selection interface page information to the terminal 200.

Then, in step S405, the controller 250 of the terminal 200 configures an item selection interface page using the item selection interface page information, and the display unit 220 of the terminal displays the item selection interface page for the user 400. In such a case, the item selection interface page may include, for example, an interface for the user 400 to request item recommendation management, input and/or select keywords for item recommendation management and configure settings for other item recommendation management.

Then, in step S406, the input unit 210 of the terminal 200 receives an item selection input of the user 400 that is input through the item selection interface page and transmits it to the controller 250. In such an embodiment, virtual user's experience is selected.

Then, in step S407, the communication unit 230 of the terminal 200 transmits item selection input information for identifying the item selection input of the user to the item recommendation management apparatus 300 under the control of the controller 250.

Then, in step S408, a language unit/association degree pair corresponding to the user's experience item list is obtained by the controller 320 of the item recommendation management apparatus 300. In such a case, the language unit/association degree pair is associated with each experience item in the experience item list including the user's experience item obtained in step S402 and is obtained based on a threshold value. The threshold value may be, for example, a maximum number or a minimum degree of association.

For example, in an embodiment in which the threshold value is the maximum number, the controller 320 may select the maximum number (for example, 10) of language units, among the language units for which degrees of association are set for a specific experience item in the experience item list, in descending order of the degree of association (degree of association for the corresponding experience item), and may obtain/store them as language unit-association degree pairs.

This process may be performed for all experience items included in the experience item list. If i1 to i10 are included in the experience item list, and if the language unit-association degree pair corresponding to i1 is p1_1 to p1_10, p2_1 to p2_10 . . . p10_1 to p10_10 may be obtained/stored through the same process. The language unit-association degree pair thus obtained may be used to obtain a language unit-user association degree in step S431.

For example, in an embodiment in which the threshold value is the maximum number, the controller 320 may select language units that have a degree of association (degree of association for the corresponding experience item) equal to or higher than a smallest degree of association among the language units for which degrees of association are set for a specific experience item in the experience item list, and may obtain/store them as language unit-association degree pairs. This process may be performed for all experience items included in the experience item list.

The process of steps S410 to S430 may be provided when additional management by the administrator is required, or may be omitted. In addition, in the process of S410 to S430, the interface may be provided to a service manager, instead of a user.

Then, in step S410, a screen, a web chart, and a scatter chart of "major language unit for each language unit list" are generated for each language unit list by the controller 320 of the item recommendation management apparatus 300.

Then, in step S411, the communication unit 310 of the item recommendation management apparatus 300 transmits the screen, the web chart, and the scatter chart of "major language unit for each language unit list" to the terminal 200, under the control of the controller 320.

Then, in step S412, the display unit 220 of the terminal 200 displays the screen, the web chart, and the scatter chart of "major language unit for each language unit list" for the user 400.

Then, in step S413, the input unit 210 of the terminal 200 receives an input of enlargement from the user 400 on the scatter chart.

Then, in step S414, the communication unit 230 of the terminal 200 transmits enlarged similar language unit information according to the enlargement input of the user 400 to the item recommendation management apparatus 300 under the control of the controller 250.

Then, in step S415, similar language unit interface page information is generated by the controller 320 of the item recommendation management apparatus 300.

Then, in step S416, the communication unit 310 of the item recommendation management apparatus 300 transmits the similar language unit interface page information to the terminal 200.

Then, in step S417, the controller 250 of the terminal 200 configures a similar language unit interface page using the similar language unit interface page information, and the display unit 220 of the terminal displays the similar language unit interface page for the user 400.

Then, in step S418, the input unit 210 of the terminal 200 receives an edit input for a specific language unit list from the user 400 and transmits it to the controller 250.

Then, in step S419, the communication unit 230 of the terminal 200 transmits edit input information for the specific language unit list for identifying the edit input for the specific language unit list to the item recommendation management apparatus 300 under the control of the controller 250.

Then, in step S420, interface page information for adding/deleting a language unit corresponding to the specific language unit list is generated by the controller 320 of the item recommendation management apparatus 300.

Then, in step S421, the communication unit 310 of the item recommendation management apparatus 300 transmits the interface page information for adding/deleting a language unit corresponding to the specific language unit list to the terminal 200 under the control of the controller 320.

Then, in step S422, the controller 250 of the terminal 200 configures an interface page for adding/deleting a language unit by using the interface page information for adding/deleting a language unit, and the display unit 220 displays the interface page for adding/deleting a language unit corresponding to the specific language unit list for the user 400.

Then, in step S423, the input unit 210 of the terminal 200 adds/deletes a language unit requested to be added/deleted through the interface page for adding/deleting a language unit corresponding to the specific language unit list.

Then, in step S424, the input unit 210 of the terminal 200 receives an input of "select a language unit" from the user 400 and transmits it to the controller 250.

Then, in step S425, the communication unit 230 of the terminal 200 transmits the input of "select a language unit" for identifying the input of "select a language unit" to the item recommendation management apparatus 300 under the control of the controller 250.

Then, in step S426, the controller 320 of the item recommendation management apparatus 300 generates add/delete interface page information for the entire language units.

Then, in step S427, the communication unit 310 of the item recommendation management apparatus 300 transmits the add/delete interface page information for the entire language units to the terminal 200 under the control of the controller 320.

Then, in step S428, the controller 250 of the terminal 200 configures an add/delete interface page by using the add/delete interface page information, and the display unit 220 displays the add/delete interface page for the entire language units for the user 400. In such a case, the language units are grouped and displayed according to the list.

Then, in step S429, the input unit 210 of the terminal 200 receives an add/delete input for the entire language units from the user 400 and transmits it to the controller 250.

Then, in step S430, the communication unit 230 of the terminal 200 transmits add/delete input information for the entire language units for identifying the add/delete input for the entire language units to the item recommendation management apparatus 300 under the control of the controller 320.

Then, in step S431, a language unit-user association degree between the user and each language unit is obtained, based on the language unit-association degree pair of the entire language units corresponding to the experience item list, by the controller 320 of the item recommendation management apparatus 300. In some embodiments, the controller 320 may set a language unit-user association degree so that a cumulative value of degrees of association corresponding to a specific language unit and a language unit-user association degree between the user and the specific language unit have a positive correlation for the entire language unit-association degree pairs corresponding to the experience item list. For example, in a case where the experience item list includes item 1, item 2, item 3, ... item k, and a set of the language unit-association degree pairs corresponding to item n is $\{(T1, W1\_n), (T2, W2\_n), ..., (Tj, Wj\_n)\}$, the cumulative value of the degrees of association corresponding to a specific language unit Tm may be $$\sum_{n=1}^{k}(Wm\_n).$$

In such a case, Wm_n is a degree of association between an item n and the specific language unit Tm. In some embodiments, when the degree of association between the item n and the specific language unit Tm is 0 or less than a specific reference value, information corresponding to the language unit-association degree pair (Tm, Wm_n) may not be stored. Then, in a case where the information corresponding to the language unit-association degree pair (Tm, Wm_n) is not stored, the controller 320 may determine that the degree of association between the item n and the specific language unit Tm is 0.

In some embodiments, the controller 320 may set the language unit-user association degree so that for the entire language unit-association degree pairs corresponding to the experience item list, the cumulative value of the degrees of association corresponding to a specific language unit becomes the language unit-user association degree between the user and the specific language unit, or the cumulative value of the degrees of association corresponding to a specific language unit is proportional to the language unit-user association degree between the user and the specific language unit.

Then, in step S432, the controller 320 of the item recommendation management apparatus 300 generates user recommendation item list information based on the language unit-user association degree.

For example, the controller 320 may set an item-user association degree so that a certain value having a positive correlation with the language unit-user association degree for a specific language unit and the language unit-item association degree for a specific language unit has a positive correlation with a cumulative value for the entire language units.

In some embodiments, the controller 320 may set the item-user association degree so that a certain value obtained by multiplying the language unit-user association degree for a specific language unit by the language unit-item association degree for a specific language unit has a positive correlation with the cumulative value for the entire language units.

In some embodiments, the controller 320 may set the item-user association degree so that a certain value obtained by multiplying the language unit-user association degree for a specific language unit by the language unit-item association degree for a specific language unit is the cumulative value for the entire language units.

For example, if the language unit-user association degree between a specific language unit i and the user is $U_i$, and if the language unit-item association degree between the specific item $I_j$ and the language unit i is $R_{ij}$, the item-user association degree between the specific item $I_j$ and the user may be expressed as $$\sum_{i=0}^{k-1} f(R_{ij}, U_i).$$

In such a case, k is the number of language units having a non-zero language unit-item association in relation to the specific item $I_j$. In such a case, f(x, y) may be, for example, a product of x and y, or another operation that allows x and y to have a positive correlation in f(x, y). In a modified embodiment, another operation including, for example, proportional and logarithmic operations in which the item-user association degree and the cumulative value $$\sum_{i=0}^{k-1} f(R_{ij}, U_i)$$

have a positive correlation, instead of the mere cumulation $$\sum_{i=0}^{k-1}$$

may be used to calculate the item-user association degree.

The controller 320 may generate a user recommendation item list according to the item-user association degree.

Then, in step S433, the communication unit 310 of the item recommendation management apparatus 300 transmits user recommendation item list information to the terminal 200, under the control of the controller 320.

Then, in step S434, the controller 250 of the terminal 200 configures a user recommendation item using the user recommendation item list information, and the display unit 220 displays the user recommendation item for the user 400.

Then, in step S435, the input unit 210 of the terminal 200 receives an input of "select a recommendation item" from the user 400 and transmits it to the controller 250.

Then, in step S436, the communication unit 230 of the terminal 200 transmits "select a recommendation item" input information for identifying the input of "select a recommendation item" to the item recommendation management apparatus 300, under the control of the controller 250.

Then, in step S437, the controller 320 of the item recommendation management apparatus 300 generates language unit category page information in which for each language unit category, language units are displayed, based on a threshold value, in descending order of a language unit-list association degree in relation to the experience item list.

Then, in step S438, the communication unit 310 of the item recommendation management apparatus 300 transmits the language unit category page information to the terminal 200, under the control of the controller 320.

Then, in step S439, the controller 250 of the terminal 200 configures a language unit category page using the language unit category page information, and the display unit 220 displays a language unit category page for the user 400.

In such a case, the language unit category page information may include a scatter chart in which for each language unit category, visual indications indicating language units corresponding to the corresponding language unit category are distributed visually in a 2D vector location according to a pattern in which language units appear in a document. In such a case, the language unit may be vectorized using Word2vec or the like. In addition, vector two-dimensionalization may be considered as reducing the dimension using PCA (main component analysis) or the like for vector visualization compression and further processing.

In addition, the language unit category page information may include an interface that displays, for the user, upon receiving the enlargement input from the scatter chart, a similar language unit scatter chart enlarged according to the received enlargement input. In such a case, the enlargement input may be implemented using at least one of known or future possible methods such as double tap/click, touch (click) of a specific interface object, input of a specific button, or the like. In addition, in the scatter chart, visual indications indicating two language units having similar locations appearing in a document are displayed at adjacent locations, and one or more of a size or a color of visual indications indicating the language units are distinctively displayed according to the language unit-list association degree in relation to the experience item list. In such a case, if the language unit-list association degree is higher, it may be displayed larger, or with a darker color, a deeper color, a brighter color, or the like, or different colors may be used according to the degree of association.

In addition, the language unit category page information may include a graph in which, for each language unit category, one or more of a height or a width of a corresponding visual object are distinctively displayed according to the language unit-list association degree in relation to the experience item list and the language unit corresponding to the corresponding language unit category. In such a case, the graph may be a web chart, bar graph, line graph, or other similar graph.

The language unit category page information may be configured to provide an interface in which when the user selects an area corresponding to a certain language unit category through clicking or touching, a language unit corresponding to the certain language unit category is added as a language unit corresponding to the experience item list or removed from a set of language units corresponding to the experience item list. When receiving an edit request, input through an interface, to add a language unit corresponding to a certain language unit category as a language unit corresponding to the experience item list or remove the language unit from the language units corresponding to the experience item list, the controller 320 of the item recommendation management apparatus 300 may add or remove the language unit corresponding to the experience item list according to the received edit request, and the controller 320 of the item recommendation management apparatus 300 may generate a recommendation item list by reflecting the addition or deletion of the language unit according to the edit request, and transmit the recommendation item list to the terminal, and may generate a recommendation item list by reflecting adjustment of degree of association according to an association degree adjustment request and transmit it to the terminal. In such a case, when adding a language unit, the experience item list-language unit association degree may be set as a preset default value.

The recommendation item list may be automatically updated or updated upon request through a specific button (interface) and then transmitted.

In addition, the language unit category page information may be configured to provide, when receiving an association degree adjustment input from a user, an interface for adjusting a language unit-list association degree between the language unit and the experience item list. The controller 320 of the item recommendation management apparatus 300, when receiving the association degree adjustment input from the user or receiving an association degree adjustment request for adjusting the language unit-list association degree between the language unit and the experience item list, may adjust the language unit-list association degree between the language unit and the experience item list according to the association degree adjustment request.

In the embodiments of FIGS. 4A to 4C, it is assumed that a page in a visual form is provided to a user, but it is also possible to provide an interface or result information through voice. In this case, a voice output unit may be used instead of the display unit 220. Instead of a visual/acoustic scheme, other methods of interface being currently developed, or to be developed in the future may be used in relation to the user 400. In such a case, the item recommendation management apparatus 300 may provide the terminal 200 with information converted in other s, suitable for the interface scheme, instead of page information.

In embodiments illustrated in the drawings starting from FIG. 5, the user 400 desires to receive information about an object in a specific field of interest in which he or she is interested in. However, the scope of the present disclosure is not limited thereto.

A field of interest may be, e.g., the type of objects. For example, when the field of interest is "Celebrity," objects corresponding to this field of interest may include "Si-min Yu," "Jae-seok Yu," "Taylor Swift," etc. For example, when the field of interest is "Movie," objects corresponding to this field of interest may include "Dunkirk," "Spider-Man: Homecoming," "Despicable Me 3," etc. For example, when the field of interest is "Broadcast program," objects corresponding to this field of interest may include "Muhandogeon (Infinite Challenge)," "American Idol," "Game of Thrones," etc.

In the following embodiments, documents are collected in order to evaluate the relationship (the degree of association, weight, and/or the like) between keywords. The collected documents may be evaluated as having the same value, or a newer document may be evaluated as having a higher value. In other words, the degrees of association between the age of a document based on an evaluation date and keywords appearing in the document may have a negative correlation.

In the process starting from FIG. 5, the value may vary depending on the up-to-dateness of a document. For example, the degree of association of a case where two keywords appear in a document which is one day old at evaluation time may be evaluated as being ten times higher than that of a case where two keywords appear in a document which is ten days old at the evaluation time. The age of a document may be evaluated, e.g., on a second/minute/hour basis or on a day/month/year basis. The controller 320 may extract the degree of association between two keywords by extracting the partial degree of association reflecting the age of the document through the division of the value of the partial degree of association by the age of the document and then accumulating the partial degrees of association.

The time at which a document was generated, which is used to determine the age of the document, may be determined using, e.g., a posting time included inside the document and/or metadata. Alternatively, when a document which had not been found during previous crawling is newly found through periodic crawling, it is determined that a new document is added at new crawling time.

FIG. 5 is a flowchart illustrating a process of managing item recommendation according to an embodiment.

In step S510, an object-keyword association degree corresponding to an object item and a representative attribute keyword pair is stored in the storage 330 by the controller 320. The process of step S510 may be performed according to some of the embodiments of FIGS. 6 to 8, or a similar process, or a process corresponding thereto. In some embodiments, the process of step S510 may be performed by input of an administrator or by receiving an object-keyword association degree determined by an external system through a network or storage medium.

In an embodiment, the object-keyword association degree stored as described above is as illustrated in FIG. 10 in which an object-keyword association degree according to an embodiment is illustrated. In the embodiment of FIG. 10, object items are all in m ($i_1$ to $i_m$) in number, and representative attribute keywords are all n ($k_1$ to $k_n$) in number. For example, the object-keyword association degree between the object item $i_5$ and the representative attribute keyword $k_3$ is $w_{5,3}$.

In addition, step S510 is as follows with reference to FIG. 6 illustrating a detailed procedure of step S510 of FIG. 5.

Referring to FIG. 6, in step S610, a representative attribute keyword candidate set is extracted from a first set of documents by the controller 320. In this case, the controller 320 may collect keywords frequently appearing in a document corresponding to a field of interest among the first set of documents, for example, as a representative attribute keyword candidate set.

Figure 7:
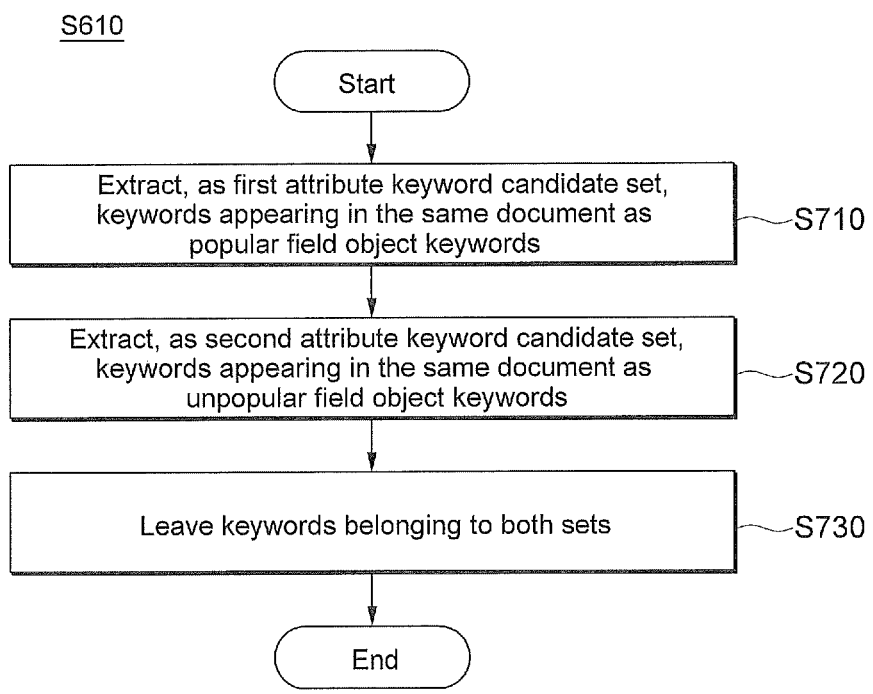
FIG. 7 is a detailed flowchart illustrating some steps of FIG. 6.

In addition, step S610 is as follows with reference to FIG. 7 illustrating a detailed procedure of step S610 of FIG. 6.

Referring to FIG. 7, the controller 320 may set keywords appearing in a document such as an object keyword indicating an object item belonging to a particular field of interest and keywords appearing in a document such as a field keyword indicating a specific field of interest as a first attribute keyword candidate set and a second attribute keyword candidate set.

For example, when a target field of interest for the provision of item recommendation management service is "Celebrity," field keywords may include "celebrity," "entertainer," "movie star," "star," "celeb," etc. The field keywords may be set by an administrator, and may be recommended and set by the controller 320. The controller 320 may obtain some field keywords, and may then recommend and set similar keywords, whose degree of association with each of the field keywords is analyzed as being equal to or larger than a preset value, as additional field keywords.

When a target field of interest for the provision of item recommendation management service is "Celebrity," object keywords may be individual persons belonging to the corresponding field of interest. For example "Jae-seok Yu," "Taylor Swift," "Stephen Curry," etc. may be object keywords corresponding to the field of interest "Celebrity."

In such a case, as for the relationship between the field keyword and the object keyword, the field keyword may correspond to, for example, an attribute or type of the object keyword. If the field keyword represents a set, the object keyword may be those representing elements belonging to the set.

In addition, the object keyword may be set by the administrator or selected in a manner similar to the field keyword. According to an embodiment, the controller 320 may analyze the context of the collected documents and select keywords determined as elements belonging to the set represented by the field keyword as an object keyword.

In addition, popular object keywords and unpopular object keywords may be classified according to the search/collect amount of the corresponding object keywords. The controller 320 may search/collect a document including each object keyword, set an object keyword of which a collection amount is greater than or equal to a specific threshold value as a popular object keyword, and set the remaining object keywords as unpopular object keywords.

In addition, keywords in the popular field and keywords in the unpopular field may be classified according to the search/collect amount of the corresponding field keyword. The controller 320 may search/collect a document including each field keyword, set a field keyword of which collection amount is greater than or equal to a specific threshold value as a popular field keyword, and set the remaining field keywords as unpopular field keywords. However, the threshold value separating the popular object keyword from the unpopular object keyword and the threshold value separating the popular field keyword from the unpopular field keyword may have different values. Hereinafter, for convenience, the popular object keyword and the popular field keyword are collectively referred to as a popular field/object keyword. In addition, for convenience, the unpopular object keyword and the unpopular field keyword are collectively referred to as the unpopular field/object keyword.

In an embodiment, in a modified embodiment, only popular field keywords or popular object keywords may be used instead of popular field/object keywords. In a modified embodiment, only the unpopular field keyword or the unpopular object keyword may be used instead of the unpopular field/object keyword.

In step S710, the controller 320 sets keywords appearing in the same documents as a popular field object keyword as a first attribute keyword candidate set.

In such a case, the controller 320 may search for/collect documents containing the popular field/object keyword and may set keywords included in the collected documents as the first attribute keyword candidate set.

According to another embodiment, the controller 320 may exclude a field keyword and an object keyword among keywords included in the collected documents from the first attribute keyword candidate set. In addition, the controller 320 may exclude a preset insignificant keyword, e.g., a postpositional particle/article and/or the like, from the first attribute keyword candidate set. In addition, according to another embodiment, the controller 320 may assign a keyword registered in a preset dictionary among the keywords included in the collected documents in the first attribute keyword candidate set.

In addition, according to another embodiment, the controller 320 may search for/collect documents containing the popular field/object keyword and may include keywords disposed within a preset distance from the popular field/object keyword or a sentence containing the keyword in the collected documents in the first attribute keyword candidate set. In addition, according to another embodiment, the controller 320 may search for/collect documents containing the popular field/object keyword and may include keywords used to describe and modify the popular field/object keyword, in the first attribute keyword candidate set by analyzing the contexts of the collected documents.

In an embodiment, a distance between keywords or a distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence. The controller 320 may first perform morpheme analysis in order to perform keyword analysis.

In step S720, the controller 320 sets keywords appearing in the same documents as an unpopular field/object keyword as a second attribute keyword candidate set.

In such a case, the controller 320 may search for/collect documents containing the unpopular field/object keyword and may set keywords included in the collected documents as the second attribute keyword candidate set.

According to another embodiment, the controller 320 may exclude a field keyword and an object keyword among keywords included in the collected documents from the second attribute keyword candidate set. In addition, the controller 320 may exclude a preset insignificant keyword, e.g., a postpositional particle/article and/or the like, from the second attribute keyword candidate set. In addition, according to another embodiment, the controller 320 may assign a keyword registered in a preset dictionary among the keywords included in the collected documents in the second attribute keyword candidate set.

In addition, according to another embodiment, the controller 320 may search for/collect documents containing the unpopular field/object keyword and may include keywords disposed within a preset distance from the unpopular field/object keyword or a sentence containing the keyword in the collected documents in the second attribute keyword candidate set. In addition, according to another embodiment, the controller 320 may search for/collect documents containing the unpopular field/object keyword and may include keywords used to describe and modify the unpopular field/object keyword, in the second attribute keyword candidate set by analyzing the contexts of the collected documents.

In an embodiment, a distance between keywords or a distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence. The controller 320 may first perform morpheme analysis in order to perform keyword analysis.

In step S730, the controller 320 may set keywords belonging to both the first attribute keyword candidate set and the second attribute keyword candidate set as a representative attribute keyword candidate set. In other words, keywords used to modify both a popular field/object keyword and an unpopular field/object keyword may be collected as the representative attribute keyword candidate set.

According to another embodiment, in step S610, the controller 320 may include keywords each appearing along with an object keyword and/or a field keyword in the representative attribute keyword candidate set regardless of the popularity/unpopularity thereof.

Referring back to FIG. 6, in step S620, the controller 320 extracts two or more subordinate keywords, associated with each representative attribute keyword included in the representative attribute keyword candidate set, from the second set documents.

The second set documents used for the subordinate keyword extraction of step S620 and the first set documents used for the representative attribute keyword candidate set extraction of step S610 may be different document sets, or may be the same document set. For example, the first set documents may be a set including all collectable documents, and the second set documents may be a set including only documents in which a specific target field of interest for the provision of item recommendation management service is used as a main keyword. The controller 320 may analyzes whether or not each document is a document in which a specific target field of interest for the provision of item recommendation management service is used as a main keyword based on frequently appearing keywords by analyzing collectable documents.

According to another embodiment, the first set documents and the second set documents may be all sets each including all collectable related documents. In addition, according to another embodiment, the first set documents may be a set including all collectable related documents, and the second set documents may be a set including only documents related to a specific target field of interest for the provision of item recommendation management service.

According to another embodiment, the second set documents may be a set including all collectable related documents, and the first set documents may be a set including only documents related to a specific target field of interest for the provision of item recommendation management service.

For step S620, the controller 320 may collect documents including a keyword representative of a specific target field of interest itself and/or documents each including an object keyword belonging to the corresponding field of interest, e.g., in order to generate a set including only documents related to the specific field of interest for the provision of item recommendation management service, extracts documents in which the weight of a field keyword/object keyword is equal to or larger than a preset value, from among the collected documents, and may generate a set including only documents related to the specific field of interest. The weight of the field keyword/object keyword may be determined based on the appearing frequency or appearing locations of the field keyword/object keyword, context, or the like. For example, a document in which the field keyword/object keyword appears frequently, is used as the title of the corresponding document, or is described in large letters or emphasizing fonts may be classified as a document related to the specific field of interest.

In step S620, the controller 320 may extract a preset number of subordinate keywords each having a highest degree of association with each representative attribute keyword by, e.g., analyzing at least part of the second set documents, thereby extracting two or more subordinate keywords associated with each representative attribute keyword.

In such a case, the controller 320 may determine the degree of association between a representative attribute keyword and a subordinate keyword, e.g., by taking into account the frequency at which the subordinate keyword appears in the same or similar context as the representative attribute keyword. For example, words appearing near keyword A in a specific sentence may be regarded as also appearing near a word associated with keyword A in another document.

"I went on a trip after making a hard decision, but it was July and, thus, the weather was so hot that I suffered."

"I went on a trip after making a hard decision, but it was July and, thus, the weather was so humid that I suffered."

Referring to the above two sentences, the word "hot" is replaced with the word "humid" in the same context. The controller 320 may infer that "hot" and "humid" are associated words.

"I went on a trip after making a hard decision, but it was July and, thus, the weather was so hot that I suffered."

"I went on vacation after making a hard decision, but it was July and, thus, the weather was so hot that I suffered."

In the same manner, the controller 320 may infer from the above two sentences that "trip" and "vacation" are associated words.

"I went on a trip after making a hard decision, but it was July and, thus, the weather was so hot that I suffered."

"I went on a trip after making a hard decision, but it was August and, thus, the weather was so hot that I suffered."

In the same manner, the controller 320 may infer that "July" and "August" are associated words.

The controller 320 may stores information in which "hot" and "humid" are associated words, "July" and "August" are associated words, and "trip" and "vacation" are associated words via previously collected documents. Then, it is assumed that the following sentences are collected.

"I went on vacation after making a hard decision, but it was July and, thus, the weather was so hot that I suffered."

"I went on a trip after making a hard decision, but it was August and, thus, the weather was so hot that I went through hardship."

When the two sentences do not have the same context but it is known that "hot" and "humid" are associated words, "July" and "August" are associated words, and "trip" and "vacation" are associated words, the controller 320 may learn that "suffer" and "hardship" are also associated words via the above sentences.

It may be determined that a keyword pair having a high appearing frequency in the same/similar contexts has a high degree of association. In addition, it is determined that the higher the similarity between contexts in which two keywords appear is, the higher the degree of association between the two keywords is. The controller 320 may increase the accuracy of the determination of the degrees of association between keywords in such a manner as to set the degrees of association keywords by performing learning by using collected documents and then setting the degrees of association between keywords appearing in a corresponding sentence by using the set degrees of association between keywords and the context of the sentence.

As similar learning methods, Neural Net Language Model (NNLM), Recurrent Neural Net Language Model (RNNLM), word2vec, skipgram, and Continuous Bag-of-Words (CBOW) methods are known. In particular, when the word2vec method is used, the word2vec method may map individual keywords to vectors by performing learning by using documents, and may determine the similarity between two keywords through the cosine similarity calculation of two vectors.

By means of such a method or a similar method, the controller 320 may extract a preset number of subordinate keywords having the highest degree of association with each representative attribute keyword by analyzing at least part of the second set documents.

In step S630, the controller 320 may extract an association weight corresponding to a pair of each representative attribute keyword within the representative attribute keyword candidate set and each subordinate keyword from the second set documents.

Figure 8:
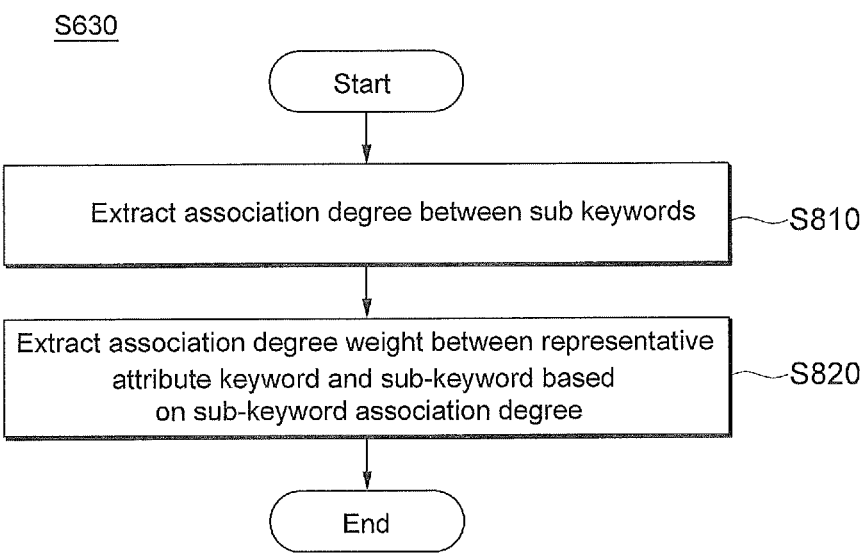
FIG. 8 is a detailed flowchart illustrating some other steps of FIG. 6.

In addition, the step S630 is as follows with reference to FIG. 8 illustrating a detailed procedure of step S630 of FIG. 6.

Referring to FIG. 8, in step 810, the controller 320 may extract the degrees of association between the subordinate keywords by analyzing at least part of the second set documents. For example, it is assumed that subordinate keywords collected as subordinate keywords associated with representative attribute keyword A1 are 50 subordinate keywords $B1_1$ to $B1_{50}$. In this case, the controller 320 may extract the degree of association between two subordinate keywords by using the frequency at which the two subordinate keywords appear in the same document, for these 50 subordinate keywords. The degree of association between $B1_1$ and $B1_2$ is determined based on the frequency at which $B1_1$ and $B1_2$ appear in the same document. According to another embodiment, the frequency at which $B1_1$ and $B1_2$ appear in the same document influences the degree of association, and, additionally, in the case where $B1_1$ and $B1_2$ appear in the same document, as the distance between the two keywords $B1_1$ and $B1_2$ (or the distance between the sentences in which two keyword appear) is closer, a higher degree of association may be recognized. In a similar method, the degrees of association between subordinate keywords may be extracted. The distance between keywords or the distance between a keyword and a sentence may be determined based on, e.g., any one or more of the number of sentences located between the two keywords or between the keyword and the sentence, the number of words located between the two keywords or between the keyword and the sentence, the number of phases located between the two keywords or between the keyword and the sentence, and the number of letters located between the two keywords or between the keyword and the sentence.

In step S820, the controller 320 may extract association weights between each representative attribute keyword and the subordinate keywords based on the degrees of association between the subordinate keywords.

In such a case, for a subordinate keyword set corresponding to each representative attribute keyword, the controller 320 may set a specific subordinate keyword within the subordinate keyword set and the representative attribute keyword so that the degree of association between the specific subordinate keyword within the subordinate keyword set and another subordinate keyword within the subordinate keyword set and an association weight between the specific subordinate keyword and the representative attribute keyword have a positive correlation therebetween.

For example, the higher the degrees of association between the subordinate keyword $B1_1$ of the representative attribute keyword A1 and other subordinate keywords $B1_2$ to $B1_{50}$ of the representative attribute keyword A1 are, the higher value the association weight between A1 and $B1_1$ may be set to. For example, the arithmetic mean (or sum) of the degrees of association between $B1_1$ and the other subordinate keywords $B1_2$ to $B1_{50}$ of A1 may become the association weight between $B1_1$ and A1. A geometric mean/harmonic mean may be used in place of a simple arithmetic mean. There may be used a truncated mean designed to calculate a mean with the two highest ones (examples) of the degrees of association between $B1_1$ and the other subordinate keywords $B1_2$ to $B1_{50}$ of A1 and the two lowest ones (examples) thereof excluded from the calculation. A median may be used in place of the arithmetic mean of the degrees of association.

In some embodiments, "the frequency at which $B1_1$ and $B1_2$ appear in the same document" used to calculate the association weight of $B1_1$ for A1 does not vary simply depending on the number of documents in which $B1_1$ and $B1_2$ appear together (in which $B1_1$ and $B1_2$ appear in the same sentence, or in which $B1_1$ and $B1_2$ appear in close proximity to each other), but may be obtained by dividing the number of documents in which $B1_1$ and $B1_2$ appear together (in which $B1_1$ and $B1_2$ appear in the same sentence, or in which $B1_1$ and $B1_2$ appear in close proximity to each other) by the number of documents in which $B1_1$ appears and/or the number of documents in which $B1_2$ appears. In a similar manner, "the frequency at which $B1_1$ and $B1_2$ appear in the same document" may be set such that it has a positive correlation in connection with the number of documents in which $B1_1$ and $B1_2$ appear together (in which $B1_1$ and $B1_2$ appear in the same sentence, or in which $B1_1$ and $B1_2$ appear in close proximity to each other) and has a negative correlation in connection with the number of documents in which $B1_1$ appears and/or the number of documents in which $B1_2$ appears. This is a kind of normalization intended to prevent a frequently used word from simply having a high association weight in connection with the representative attribute keyword A1.

Referring back to FIG. 6, in step S640, the controller 320 may extract the degrees of subordinate association between an object item and subordinate keywords from the first set documents.

It may be determined that subordinate keywords frequently appearing in the same document, the same sentence or a close sentence as an object keyword (for example "Taylor Swift") representative of an object item in the first set documents are associated with the corresponding object item.

In an embodiment, the controller 320 may collect documents in which the object keyword of the corresponding object item appears, and may extract the degree of subordinate association between each subordinate keyword and the object keyword based on the frequency at which they appear together within the documents. In particular, when a subordinate keyword appears in the same sentence as the object keyword, the controller 320 may set the degree of association between the subordinate keyword and the object item to a higher value than when the subordinate keyword appears in a sentence different from that in which the object keyword appears.

In an embodiment, the controller 320 may set the degree of association between the subordinate keyword and the object item of the corresponding object keyword to a higher value in proportion to the proximity between a sentence in which the subordinate keyword appears and a sentence in which the object keyword appears. The proximity between two sentences may be determined based on, e.g., any one or more of the number of sentences located between the two sentences, the number of words located between the two sentences, the number of phases located between the two sentences, and the number of letters located between the two sentences.

The controller 320 may set the degree of association between the subordinate keyword and the object item of the corresponding object keyword to a higher value in proportion to the proximity between a location at which the subordinate keyword appears and a location at which the object keyword appears. The proximity between the subordinate keyword and the object keyword may be determined based on, e.g., any one or more of the number of sentences located between the subordinate keyword and the object keyword, the number of words located between the subordinate keyword and the object keyword, the number of phases located between the subordinate keyword and the object keyword, and the number of letters located between the subordinate keyword and the object keyword.

In step S650, the controller 320 may extract the object-keyword association degree between the object item and the representative attribute keyword by using the degrees of subordinate association of step S640 and the association weights of step S630.

For example, the object-keyword association degree between object item C and the representative attribute keyword A1 may be extracted using the degrees of subordinate association between C and the subordinate keywords (e.g., $B1_1$ to $B1_{50}$) of A1 and the association weights of the respectively subordinate keywords. For example, the object-keyword association degree between the object item C and the representative attribute keyword A1 may be set to a higher value in proportion to the degrees of subordinate association between the object item C and the subordinate keywords $B1_1$ to $B1_{50}$.

When the degree of subordinate association with the object item C is higher for a subordinate keyword having a higher association weight in the relation to A1, the object-keyword association degree between the object C and the representative attribute keyword A1 may be set to a higher value for a subordinate keyword having a lower association weight than a case having a higher degree of subordinate association. For example, the degree of subordinate association of a keyword $B1_1$ having a higher association weight is higher in table 1 than in table 2, and thus the object-keyword association degree between the object C and the representative attribute keyword A1 may be set to a higher value in table 1 than in table 2.

TABLE 1

|  | Association weight in connection with A1 | Degree of subordinate association with C |
|---|---|---|
| $B1_1$ | 0.5 | 0.5 |
| $B1_2$ | 0.2 | 0.2 |

TABLE 2

|  | Association weight in connection with A1 | Degree of subordinate association with C |
|---|---|---|
| $B1_1$ | 0.2 | 0.5 |
| $B1_2$ | 0.5 | 0.2 |

According to an embodiment, the object-keyword association degree between the object C and the representative attribute keyword A1 may be obtained based on (or using) the sum of values obtained by multiplying association weights and the degrees of subordinate association corresponding to the individual subordinate keywords. In table 1, 0.5×0.5+0.2×0.2=0.29, and in table 2, 0.2×0.5+0.5×0.2=0.20. Accordingly, the object-keyword association degree between the object C and the representative attribute keyword A1 may be set to a higher value in table 1 than in table 2. The above-described method for calculating the object-keyword association degree is merely an example. As long as the degree of subordinate association in connection with C obtained in step S640 and the association weight in connection with A1 obtained in step S630 have a positive correlation with the object-keyword association degree between C and A1, another method may be used.

Then, when the communication unit 310 receives a request for the provision of information associated with the specific representative attribute keyword, the controller 320 may provide a result item via the communication unit 310 based on the object-keyword association degree extracted in step S650. For example, when receiving a request for the provision of information including any one representative attribute keyword, the controller 320 may provide information about object items in descending order of the object-keyword association degree in the relation to the corresponding representative attribute keyword.

In another embodiment, when receiving a request for the provision of information including two or more representative attribute keywords and corresponding weights, the controller 320 may provide information about object items in descending order of the sum (or mean) of values obtained by multiplying the degrees of object-keyword association degree with the representative attribute keywords included in the request for the provision of information by weights (or adding weights to the degrees of object-keyword association) for each object item.

Figure 9:
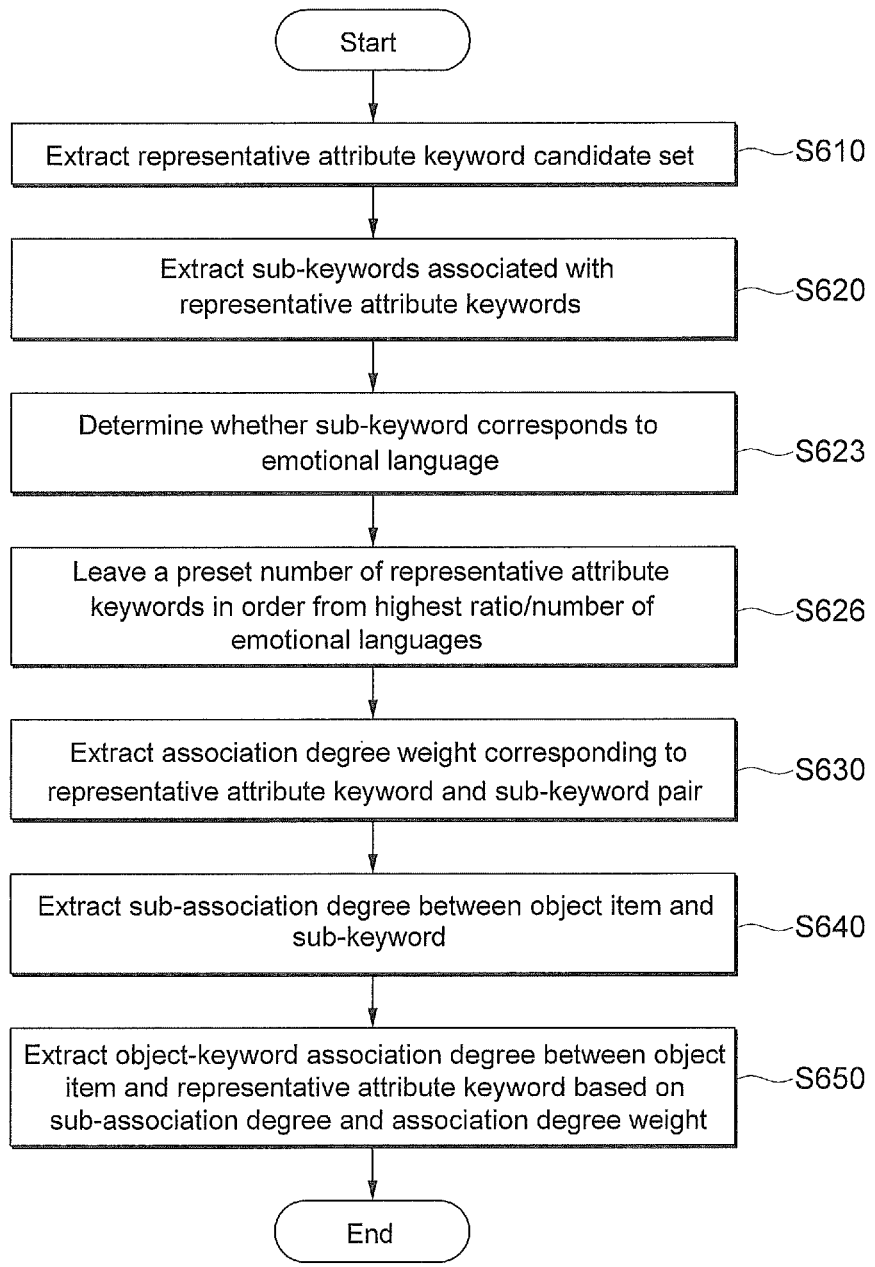
FIG. 9 is a flowchart illustrating a process of managing item recommendation according to another embodiment.

FIG. 9 is a flowchart illustrating a process of providing information according to another embodiment.

The embodiment of FIG. 9 further includes two steps S623 and S626 between steps S620 and S630 in addition to processes identical to those of the embodiment of FIG. 6. In this case, redundant descriptions will be omitted, and only steps S623 and S626 will be described.

In step S623, the controller 320 determines whether each of the subordinate keywords extracted in step S620 corresponds to an emotional language (an emotional word). For this purpose, the storage 330 or external server may hold an emotional word dictionary. The emotional word dictionary is a tool for determining whether or not a word (keyword) is an emotional word, and may hold, e.g., an emotional word list. It may be determined that a keyword included in the emotional word list is an emotional word and a keyword not included in the emotional word list is not an emotional word. However, these determinations are based on dictionary meanings, and may not reflect the use of words by the public, which varies over time. Accordingly, the controller 320 determines whether to use a representative attribute keyword based on whether or not subordinate keywords associated with the representative attribute keyword are emotional words without determining whether or not the representative attribute keyword itself is an emotional word.

In another embodiment, the controller 320 may add another word, having a high degree of association (equal to or larger than a preset value) with a preset or larger number of words registered in the emotional word dictionary as emotional words, to the emotional word dictionary.

In step S626, the controller 320 may leave a preset number of representative attribute keywords in a representative attribute keyword candidate set in descending order of the emotional word percentage (or number) of associated subordinate keywords, and may eliminate the remainder. Through this process, a keyword distant from an emotional word may be prevented from being treated as an emotional word.

Referring back to FIG. 5, in step S520, the controller 320 stores the degree of basic language unit-keyword association corresponding to each language unit-representative attribute keyword pair in the storage 330.

In such a case, language units may include expressions which may be presented by the weights of representative attribute keywords. For example, "boring" may be a language unit, and "pretty" may be a language unit.

Representative attribute keywords each having a high degree of basic language unit-keyword association in connection with the language unit "boring" may include representative attribute keywords related to the resolution of a boring situation, such as "interesting," "exciting," "time-killing," etc.

Representative attribute keywords having a high degree of basic language unit-keyword association in connection with the language unit "pretty" may include representative attribute keywords similar to "pretty" and describing "pretty," such as "beautiful," "cute," "attractive," etc.

For example, the process of step S520 may be performed by input of an administrator, or by receiving the degree of basic language unit-keyword association, determined by an external system, via a network or storage medium.

According to another embodiment, the process of step S520 may be performed by analyzing collectable documents, such as Internet information, SNS information, news, etc., and using a method similar to the processes of FIGS. 6 to 9.

In addition, the process of step S520 may include a process of reflecting the feedback of a user, as will be described below.

The process of step S520 may be performed using a method which will be described below with reference to any one of FIGS. 15 to 17.

FIG. 11 illustrates an example of the degree of basic language unit-keyword association according to an embodiment.

In the embodiment of FIG. 11, language units are all q ($C_1$ to $C_q$) in number, and representative attribute keywords are all n ($k_1$ to $k_n$) in number.

For example, the degree of basic language unit-keyword association between the language unit $C_5$ and the representative attribute keyword $k_3$ is $v_{3,5}$.

In step S530, the communication unit 310 receives and obtains a received language unit from the terminal 200, and transmits the received language unit to the controller 320. A received language unit is a language unit received by the terminal 200 from a search user. The terminal 200 may convert a voice input into an electrical signal (a voice signal), and may transmit the voice signal to the item recommendation management apparatus 300. The controller 320 of the item recommendation management apparatus 300 may analyze the voice signal, may convert the voice signal into a text, and may match the text to a language unit. In addition, the controller 320 may analyze the intonation, pitch, tempo, respiration state, etc. of a voice by analyzing the voice signal, and may use analysis results as contextual information.

According to another embodiment, the terminal 200 may convert the voice input into a text, and may transmit the text to the item recommendation management apparatus 300. The terminal 200 may analyze the intonation, pitch, tempo, respiration state of a voice, etc., and may transmit analysis information to the item recommendation management apparatus 300. The item recommendation management apparatus 300 may use the analysis information as a type of contextual information.

In step S540, the controller 320 may obtain the degree of language unit-object association corresponding to a pair of the received language unit and each object item by using the object-keyword association degree and the degree of basic language unit-keyword association.

Figure 12:
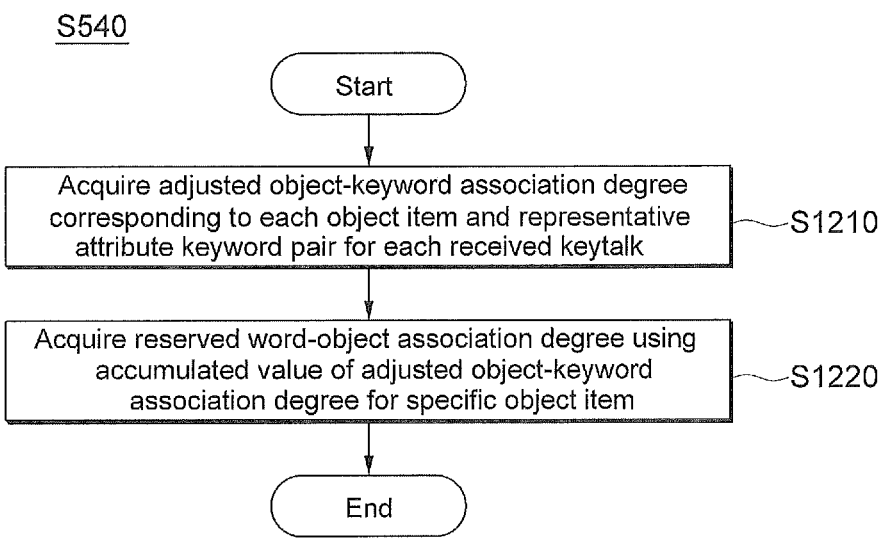
FIG. 12 is a detailed flowchart illustrating some other steps of FIG. 5.

FIG. 12 is a detailed flowchart illustrating step S540 according to an embodiment.

Referring to FIG. 12, in step S1210, the controller 320 obtains the adjusted object-keyword association degree corresponding to a pair of each object item and the representative attribute keyword for the received language unit.

According to an embodiment, for a pair of each object item and a representative attribute keyword, the controller 320 may obtain the adjusted object-keyword association degree corresponding to a pair of each object item and a representative attribute keyword for the received language unit by applying the degree of basic language unit-keyword association corresponding to a pair of the received language unit and the representative attribute keyword to the object-keyword association degree corresponding to the pair of the object item and the representative attribute keyword.

In particular, for a pair of each object item and a representative attribute keyword, the controller 320 may obtain the adjusted object-keyword association degree corresponding to a pair of each object item and a representative attribute keyword for the received language unit by using a value obtained by multiplying the object-keyword association degree corresponding to the pair of the object item and the representative attribute keyword by the degree of basic language unit-keyword association corresponding to a pair of the received language unit and the representative attribute keyword.

In addition, for a pair of each object item and a representative attribute keyword, the controller 320 may set the adjusted object-keyword association degree corresponding to a pair of each object item and a representative attribute keyword for the received language unit so that the adjusted object-keyword association degree has a positive correlation with the object-keyword association degree corresponding to the pair of the object item and the representative attribute keyword and has a positive correlation with the degree of basic language unit-keyword association corresponding to a pair of the received language unit and the representative attribute keyword.

In the present disclosure, it is assumed that the degree of object-keyword association, the degree of basic language unit-keyword association, the adjusted degree of object-keyword association, the degree of basic language unit-subordinate keyword association, and other values each representative of the degree of association are values which are each representative of a closer degree of association in proportion to the size of the value. In another embodiment, in the case where the value of a type of the degree of association is representative of a closer degree of association in inverse proportion to the size of the value and the value of another type of the degree of association value is representative of a closer degree of association in proportion to the size of the value, a positive correlation and a negative correlation are appropriately replaced with each other and then used according to the case.

For example, in order to obtain the adjusted object-keyword association degree corresponding to a pair of object item $i_4$ and representative attribute keyword $k_3$ when the received language unit is $C_2$, the controller 320 may obtain the adjusted object-keyword association degree by applying the degree of basic language unit-keyword association $v_{3,4}$ corresponding to a pair of the received language unit $C_2$ and the representative attribute keyword $k_3$ to the degree of object association $w_{4,3}$ corresponding to the pair of the object item $i_4$ and the representative attribute keyword $k_3$.

In particular, a method for applying the degree of association may be a method for multiplying the degree of object association and the degree of basic language unit-keyword association. For example, in order to obtain the adjusted object-keyword association degree corresponding to a pair of object item $i_4$ and representative attribute keyword $k_3$ when the received language unit is $C_2$, the controller 320 may obtain the adjusted object-keyword association degree by using the value $(w_{4,3} \times v_{3,2})$ obtained by multiplying the degree of object association $w_{4,3}$ corresponding to the pair of the object item $i_4$ and the representative attribute keyword $k_3$ and the degree of basic language unit-keyword association $v_{3,2}$ corresponding to a pair of the received language unit $C_2$ and the representative attribute keyword $k_3$. In another embodiment, the controller 320 may obtain the adjusted object-keyword association degree by using function $f(w_{4,3}, v_{3,2})$ based on another calculation/utilization method adapted to allow the adjusted object-keyword association degree to have a positive correlation with $w_{4,3}$ and $v_{3,2}$ in place of the multiplication. In addition, both a method for using $(w_{4,3} \times v_{3,2})$ as the adjusted object-keyword association degree and a method for applying another factor-based correction to $(w_{4,3} \times v_{3,2})$ and then using a resulting value as the adjusted object-keyword association degree may be used.

In step S1220, the controller 320 may obtain the degree of language unit-object association by using a value obtained by accumulating the adjusted degrees of object-keyword association degree for a specific object item. For example, the controller 320 may set the degree of language unit-object association corresponding to a pair of the received language unit and the specific object item so that the degree of language unit-object association has a positive correlation with the cumulative value of the adjusted degrees of object-keyword association degree for a specific object item. The degree of language unit-object association corresponding to a pair of object item $i_4$ and received language unit $C_2$ may be obtained using, e.g., $\Sigma_{j=1}^{n} f(w_{4,j}, v_{j,2})$. $f(w_{4,j}, v_{j,2})$ is the adjusted object-keyword association degree corresponding to object item $i_4$, received language unit $C_2$, and keyword $k_j$.

For example, the degree of language unit-object association corresponding to a pair of object item $i_4$ and received language unit $C_2$ may be $\Sigma_{j=1}^{n}(w_{4,j} \times v_{j,2}) = (w_{4,1} \times v_{1,2}) + (w_{4,2} \times v_{2,2}) + \ldots + (w_{4,n} \times v_{n,2})$. In another example, the degree of language unit-object association corresponding to a pair of object item $i_4$ and received language unit $C_2$ may be a value obtained by applying another factor-based correction to $\Sigma_{j=1}^{n}(w_{4,j}, v_{j,2})$.

Referring back to FIG. 5, in step S550, the controller 320 may provide an object item according to the degree of language unit-object association corresponding to the received language unit. For example, when the degrees of language unit-object association corresponding to received language unit $C_2$ are as illustrated in table 3, the controller 320 may provide object items in the order illustrated in table 4.

TABLE 3

| Object item | Degree of language unit-object association with received language unit |
|---|---|
| $i_1$ | 0.23 |
| $i_2$ | 0.33 |
| $i_3$ | 0.99 |
| $i_4$ | 0.84 |

TABLE 4

| Order | Object item | Degree of language unit-object association with received language unit |
|---|---|---|
| 1 | i3 | 0.99 |
| 2 | i4 | 0.84 |
| 3 | i2 | 0.33 |
| 4 | i1 | 0.23 |

In other words, the controller 320 may provide object items in descending order of the degree of language unit-object association corresponding to the received language unit. The terminal 200 having received the object items may provide information about object item $i_3$ to a user via the display unit 220. The terminal 200 may provide information about another object item at a lower order position when necessary. The terminal 200 may provide information about object item $i_3$ to a user by voice through a speaker in place of the display unit 220.

Figure 13:
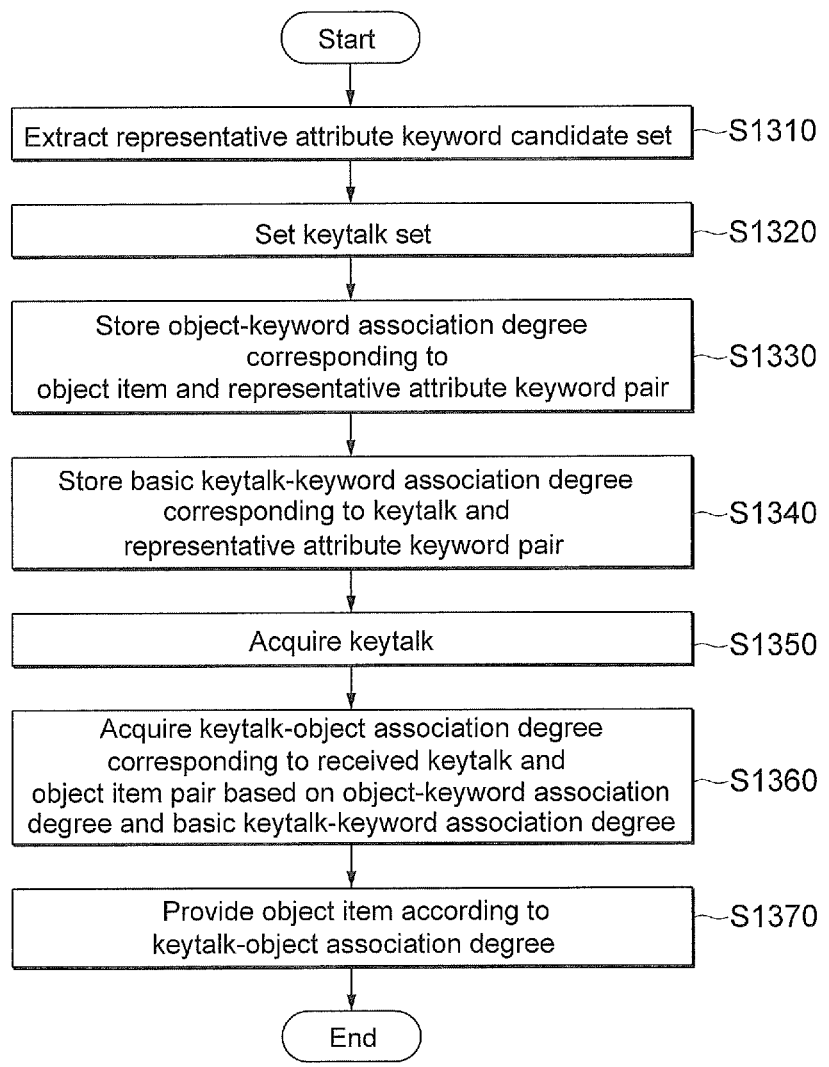
FIG. 13 is a flowchart illustrating a process of managing item recommendation according to another embodiment.

FIG. 13 is a flowchart illustrating a process of providing information according another embodiment.

The processes of FIGS. 13 to 17 may be performed by using some of the processes of FIGS. 5 to 12 or modifying some of the processes of FIGS. 5 to 12. When the processes of FIGS. 13 to 17 are described, descriptions of FIGS. 5 to 12 may be quoted when necessary.

Referring to FIG. 13, in step S1310, the controller 320 extracts a representative attribute keyword candidate set from first set documents. For example, the controller 320 may collect keywords, frequently appearing in the documents of the first set documents corresponding to a field of interest, as a representative attribute keyword candidate set. The process of step S1310 may be performed in a manner identical or similar to, e.g., that of the process of step S610 of FIG. 6. The process of step S1310 may be performed in a manner identical and similar to that of the process of FIG. 7. The description of the process of FIG. 7 is not repeated.

In step S1320, the controller 320 sets a language unit set. For example, an administrator may set a language unit set through manual input. According to a modified embodiment, the controller 320 may set word phrases/passages, etc. suitable for language units as language unit candidates, and may provide an interface configured to allow one or more of the language unit candidates as language units.

Figure 18:
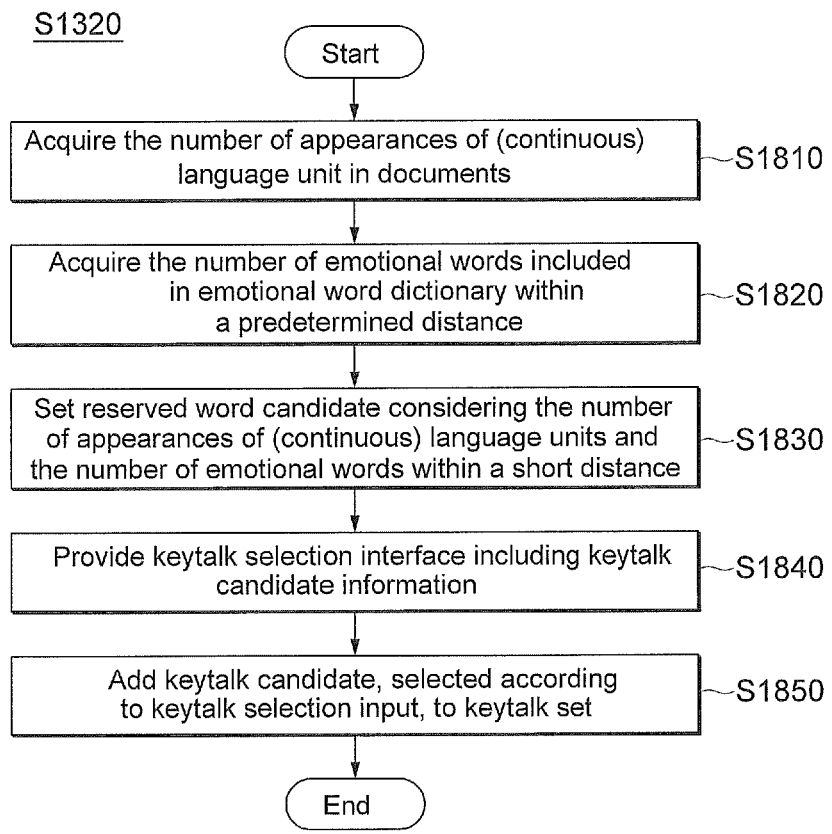
FIG. 18 is a detailed flowchart illustrating some of the steps of FIG. 13 according to a modified embodiment of the invention.

FIG. 18 is a detailed flowchart illustrating step S1320 according to a modified embodiment of the present disclosure.

In step S1810, the controller 320 obtains the appearing frequency of one language unit or two or more consecutive language units within the document set. In this case, the document set may be the same as or different from the document set used in the process of step S610 of FIG. 6.

The language unit may be, e.g., any one of a word phrase, a word, a morpheme, a syllable, and a letter. Other units defined to segment a sentence based on various criteria may be used as the language unit in the present embodiment.

Before step S1810, the controller 320 may segment documents, included in the individual documents of the document set, into word phrase units and store the word phrase units in the form of an array or list. In an embodiment, the controller 320 may delete insignificant words, e.g., some postpositional particles and demonstrative adjective, such as "this," "that," etc., in Korean, and other words not requiring analysis from each word phrase, or may remove from the array or list. In addition, in an embodiment, when a word phrase is composed of one word, the controller 320 may convert the corresponding word into a basic or preset form.

According to a modified embodiment, before step S1810, the controller 320 may segment documents, included in the individual documents of the document set, into word units and store the word units in the form of an array or list. In an embodiment, the controller 320 may convert each word into a basic (or preset) form. In an embodiment, the controller 320 may remove insignificant words, e.g., some postpositional particles and demonstrative adjective, such as "this," "that," etc., in Korean, and other words not requiring analysis from the array or list.

There may be possible a modified embodiment in which the controller 320 segments documents into morpheme units, syllable units, or letter units.

In the following embodiment, for the sake of convenience, it is assumed that the controller 320 segments the documents into word phrase units and the word phrases become language units.

A single language unit may become a language unit. According to a modified embodiment, two or more consecutive language units also become a language unit. For example, "neat" (a single language unit) may become a language unit, "nicely atmospheric" (two consecutive language units) may become a language unit. However, two or more consecutive language units appear less frequently than a single language unit. Accordingly, in an embodiment, a weight or an additional score may be given to two or more consecutive language units upon the selection of language units so that the two or more consecutive language units may be selected as a language unit. According to a modified embodiment, upon the selection of language units, a reference value for the selection of a language unit may be set to a lenient value for two or more consecutive language unit. For example, in the case where a single language unit may be recommended as a language unit candidate only when it appears at least "a" times, settings may be made such that two consecutive language units may be recommended as a language unit candidate even when they appear "b" times considerably less than "a" times and such that three consecutive language units may be recommended as a language unit candidate even when they appear "c" times less than "b" times. In the following, two or more consecutive language units are called consecutive language units.

In addition, in the case where consecutive language units are recommended/selected as a language unit, it is included in a language unit included in the language unit candidate or in the language unit candidate itself, and consecutive language units shorter than the language unit candidate may be prevented from being recommended as language units, or a deduction in a score may be made during the calculation of a score used to recommend the units as a language unit. The reason for this is to prevent a plurality of similar language units from being selected or recommended. In the following, for the sake of simplicity of description, although descriptions of consecutive language units will be omitted, descriptions of a single language unit may be applied to consecutive language units in an identical or similar manner.

In step S1810, the appearing frequency of a language unit may be, e.g., the number of documents in which the corresponding language unit appears. Even when a corresponding language unit appears in a single document a plurality of times, only an appearing frequency of 1 is recognized. In contrast, according to another embodiment, in the case where a corresponding language unit appears in a single document a plurality of times, the number of times may be all recognized as an appearing frequency, and the appearing frequency may become the appearing frequency of the language unit.

According to still another embodiment, in the case where a corresponding language unit appears in a single document two or more times, second and below appearances may be evaluated as being lower than a first appearance. In addition, in the case where the appearance of a corresponding language unit is repeated in a single document, below appearances may be evaluated as being lower. Although a score increases as the number of appearances increases, the gradient of scores gradually becomes gentle. For example, an appearance frequency to the power of $1/r$ (where $r$ is a real number larger than 1) may be used as the appearance score of a corresponding language unit in a corresponding document. For example, (the log value of an appearing frequency)+1 (where when the appearing frequency is 0, a corresponding appearance score is 0) or the like may be used. In addition, the appearance score of a language unit in a single document may be limited to a value equal to or smaller than a preset upper limit value. A value obtained by accumulating the appearance scores of a corresponding language unit for all documents may become an appearance score based on the appearing frequencies of the corresponding language unit. In addition, this appearance score may be used in step S1830.

In the following, for the sake of convenience, the following description will be given on the assumption that the appearing frequency of a language unit is the number of documents in which the corresponding language unit appears.

In step S1820, the controller 320 obtains the frequency at which an emotional word is located within a preset distance from a language unit. The distance between the language unit and the emotional word may be determined based on, e.g., any one or more of the number of words located between the language unit and the emotional word, the number of word phrases located between the language unit and the emotional word, and the number of letters located between the language unit and the emotional word.

In addition, when a language unit and an emotional word belong to different sentences, the controller 320 may determine that the emotional word is not located within the preset distance from the language unit regardless of the number of words, word phrases and/or letters located between the language unit and the emotional word. According to another modified embodiment, when a language unit and an emotional word belong to different sentences, the controller 320 may calculate the distance therebetween by adding a predetermined numerical value to a calculated distance without taking into account the sentences. The reason for this is that when a language unit and an emotional word belong to different sentences, probability that they have no degree of association is stronger, and thus it is preferable that the distance therebetween is evaluated as being longer than the number of words, word phrases and/or letters located between the language unit and the emotional word.

Whether a specific word (a word phrase) is an emotional word may be determined by referring to the previously registered emotional word dictionary.

The frequency at which an emotional word is located within a predetermined distance from a language unit may be, e.g., the number of documents in which the corresponding language unit and the corresponding emotional word are located together within a predetermined distance. Even when a corresponding language unit and a corresponding emotional word appear within the predetermined distance a plurality of times in a single document, only an appearing frequency of 1 is recognized. According to another embodiment, when an emotional word is located within a predetermined distance from a plurality of language units, all cases where the emotional word is located within the predetermined distance from the individual language units may be recognized as a frequency. In the following, a language unit located within the predetermined distance from an emotional word is called an emotional word location language unit.

According to still another embodiment, in the case where an emotional word location language unit appears in a single document two or more times, second and below appearances may be evaluated as being lower than a first appearance. In addition, in the case where the appearance of a corresponding emotional word location language unit is repeated in a single document, below appearances may be evaluated as being lower. Although a score increases as the number of appearances increases, the gradient of scores gradually becomes gentle. For example, an appearance frequency to the power of 1/r (where r is a real number larger than 1) may be used as the appearance score of a corresponding emotional word location language unit in a corresponding document. For example, (the log value of an appearing frequency)+1 (where when the appearing frequency is 0, a corresponding appearance score is 0) or the like may be used. In addition, the appearance score of an emotional word location language unit in a single document may be limited to a value equal to or smaller than a preset upper limit value. A value obtained by accumulating the appearance scores of a corresponding emotional word location language unit for all documents may become an appearance score based on the appearing frequencies of the corresponding emotional word location language unit. In addition, this appearance score may be used in step S1830.

In addition, according to another embodiment, a higher appearance score may be recognized in proportion to the number of emotional words located within a predetermined distance from one language unit. In addition, when an emotional word is located within a shorter distance from one language unit, a higher appearance score may be recognized. In addition, only when preset two or more emotional words are located within a predetermined distance from one language unit may an appearance score (an appearing frequency) be recognized.

For the sake of convenience, the following description will be given on the assumption that the appearing frequency of an emotional word location language unit is the number of documents in which an emotional word appears within a preset distance from a corresponding language unit.

In step S1830, the controller 320 selects a language unit candidate by taking into account the appearing frequency of a corresponding language unit and the frequency at which an emotional word is located within a predetermined distance from the language unit.

For example, the controller 320 obtains an emotional word score by multiplying the appearing frequency of a corresponding language unit and the frequency at which an emotional word is located within a predetermined distance from the language unit (or by using a calculation method which has a positive correlation for the two variables). In addition, a preset number of language unit candidates may be set in descending order of the score. Alternatively, language units corresponding to a preset score or more may be set as language unit candidates.

TABLE 5

| Language unit | Appearing frequency | Emotional word location frequency | Score |
| --- | --- | --- | --- |
| First language unit | 3003 | 1122 | 3369366 |
| Second language unit | 2001 | 1820 | 3641820 |
| Third language unit | 3121 | 1300 | 4057300 |
| Fourth language unit | 200 | 110 | 22000 |

In the example of table 5, the language units may become language unit candidates in order of the third language unit→the second language unit→the first language unit→the fourth language unit. When the controller 320 recommends two language unit candidates, the third language unit and the second language unit will be recommended. When the controller 320 recommends language units equal to or larger than a perfect score of 300 as language unit candidates, the third language unit, the second language unit, and the first language unit will be recommended as language unit candidates in order thereof. According to another embodiment, the controller 320 may extract a first number of language units in order of the appearing frequencies of the language units, and may then extract a predetermined number of language unit candidates in descending order based on the frequency at which an emotional word appears within a predetermined distance from the extracted language units (or an emotional word score). In the example of table 5, when three language units are extracted in descending order of their appearing frequency, the first to third language units may be extracted. Based on the appearing frequencies of emotional words, language unit candidates may be recommended in order of the second language unit, the third language unit, and the first language unit.

In addition, according to another embodiment, the controller 320 may extract a first number of language units in descending order of the appearing frequencies of the language units, and may then extract a first number of language unit candidate (where the second number is less than the first number) in descending order based on the frequency at which an emotional word appears within a predetermined distance from the extracted language units (or an emotional word score). In the example of table 5, when three language units are extracted in descending order of their appearing frequency, the first to third language units may be extracted.

When two language units are extracted based on an emotional word appearing frequency, language unit candidates may be recommended in order of the second language unit and the third language unit.

Using another method similar or slightly different from the above-described method, the controller 320 may set a score for the selection of language unit candidates so that the score for the selection of language unit candidates has a positive correlation with the appearing frequencies of language units in step S1810 and also has a positive correlation with the appearing frequencies of language units from which an emotional word is located within the preset distance in step S1820, and may recommend language unit candidates by using the score.

In addition, the controller 320 may perform processing such that a language unit already included in a language unit set may be prevented from being recommended as a language unit candidate. In addition, the controller 320 may perform processing such that a language unit substantially identical to a language unit included in the language unit set may be prevented from being added to language unit candidates.

In step S1840, the item recommendation management apparatus 300 provides the terminal 200 with interface information adapted to generate a language unit selection interface including language unit candidate information. The interface information may be, e.g., a document in an HTML form.

According to another embodiment, the interface information may include only dynamic information (recommended language unit candidates, etc.) required to generate the interface, and the terminal 200 may provide a page including the interface to a user in such a manner as to incorporate the dynamic information into a page form stored in the terminal 200 in advance.

The controller 320 may generate page information adapted to generate the page including the language unit selection interface inclusive of the language unit candidate information, and the communication unit 310 may provide the page information to the terminal 200. The terminal 200 may display the page including the corresponding interface to a user through rendering. According to a modified embodiment, an interface based on sound or an interface based on technology known currently or to be known in the future may be provided in place of the interface included in the visual page. For the sake of convenience, the following description will be given on the assumption that the interface included in the visual page is provided.

Figure 19:
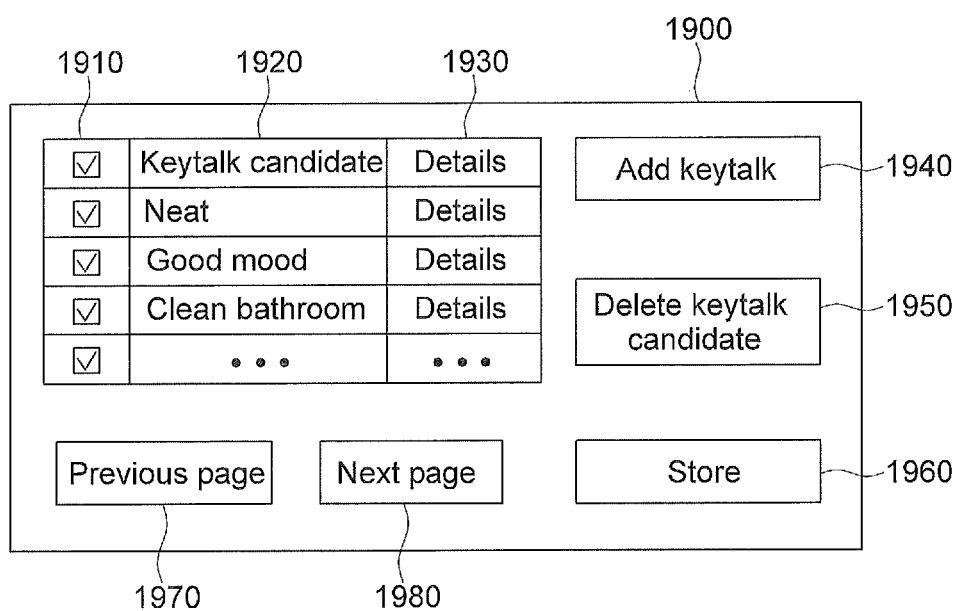
FIG. 19 is an exemplary diagram illustrating an interface generated according to interface information provided in some steps of FIG. 18.

FIG. 19 is an example of an interface 1900 generated based on the interface information provided in step S1840.

Referring to FIG. 19, the interface 1900 includes a table, including a check box column 1910, a language unit candidate column 1920, and a detailed view column 1930. In addition, the interface 1900 may include a language unit addition button 1940, a candidate deletion button 1950, and an add-to-storage box button 1960. A user may select at least one desired language unit candidate on the check box column 1910, and may process the language unit candidate by selecting any one of the language unit addition button 1940, the candidate deletion button 1950, and the add-to-storage box button 1960. Once the any one of the buttons has been selected, the terminal 200 may transmit input information, obtained by converting the input of the user, to the item recommendation management apparatus 300.

The item recommendation management apparatus 300 may process the language unit candidate according to the input information received from the terminal 200. For example, when a user selects the check boxes 1910 of some language unit candidates (hereinafter referred to as the "selected candidates") and also selects the language unit addition button 1940, the controller 320 of the item recommendation management apparatus 300 having related input information may add the selected candidates to a language unit set and also delete the selected candidates from a language unit candidate set. The controller 320 performs control such that the language units included in the language unit set and language units substantially identical to the language units included in the language unit set may be prevented from being recommended as language unit candidates upon the future recommendation of language unit candidates.

According to another example, when a user selects the check boxes 1910 of some language unit candidates and also selects the language unit candidate deletion button 1950, the controller 320 of the item recommendation management apparatus 300 having received related input information may add the selected candidates to a language unit exclusion set and delete the selected candidates from the language unit candidate set. The controller 320 performs control such that the language units included in the language unit exclusion set and language units substantially identical to the language units included in the language unit exclusion set may be prevented from being recommended as language unit candidates upon the future recommendation of language unit candidates.

In addition, according to another example, when a user selects the check boxes 1910 of some language unit candidates and also selects the add-to-storage box button 1960, the controller 320 of the item recommendation management apparatus 300 having received related input information may add the selected candidates to a language unit candidate storage set and delete the selected candidates from the language unit candidate set. The controller 320 performs control such that the language units included in the language unit candidate storage set and language units substantially identical to the language units included in the language unit candidate storage set may be prevented from being recommended as language unit candidates upon the future recommendation of language unit candidates.

Another interface similar to the buttons or another interface capable of replacing the functions of the buttons may be used in place of the buttons 1940, 1950 and 1960.

In addition, the controller 320 may provide an interface adapted to delete part of language units from the language unit set. The controller 320 may provide an interface adapted to delete a language unit from the language unit exclusion set such that part of the language units in the language unit exclusion set are prevented from being excluded from recommendation. The controller 320 may provide the language unit of the language unit candidate storage set in the form of a list interface similar to that of FIG. 19, and may enable a user to add part of the language units of the language unit candidate storage set as a language unit via the list interface. In addition, a user may include part of the language units of the language unit candidate storage set in the language unit exclusion set and delete the part of the language units from the language unit candidate storage set via the list interface. In this case, the corresponding language unit is not provided via the list interface of the language unit candidate storage set any longer, and is not recommended as a language unit candidate via the interface 1900 of FIG. 19 any longer. In addition, a user may simply delete part of the language units of the language unit candidate storage set from the language unit candidate storage set via the list interface. In this case, the corresponding language unit is not provided via the list interface of the language unit candidate storage set any longer, but may be recommended as a language unit candidate via the interface 1900 of FIG. 19.

In addition, the interface 1900 may include a previous page button 1970 and/or a subsequent page button 1980 for switching between pages in preparation for a case where language unit candidates cannot be all displayed within a single page. The previous page button 1970 and/or the subsequent page button 1980 may be selectively provided depending on the number of actual candidates and a current page location. In addition, there may be provided an interface adapted to be extendable through scrolling in place of the previous page button 1970 and/or the subsequent page button 1980. In some interfaces, only a table including the items 1910, 1920 and 1930 may be scrolled, and the buttons 1940, 1950, 1960, 1970 and 1980 may be excluded from scrolling.

A user may refer to a background for the recommendation of a language unit candidate or related information in detail by selecting the detailed view 1930. An interface which is provided by the controller 320 when the detailed view 1930 is selected may include an interface adapted to add information about a corresponding language unit candidate and the corresponding language unit candidate as a language unit, to the language unit candidate storage set, or to the language unit exclusion set.

The controller 320 may provide an interface configured to recommend and manage language unit candidates to a user via the terminal 200.

Referring back to FIG. 18, in step S1850, the controller 320 may add a selected language unit candidate to the language unit set in response to an input adapted to select the language unit.

Referring back to FIG. 13, in step S1330, the controller 320 stores the object-keyword association degree corresponding to each object item-representative attribute keyword pair.

The process of step S1330 may be performed according to, e.g., part of the embodiments of FIGS. 6 to 8, or a process similar or corresponding to the part. According to another embodiment, the process of step S1330 may be performed by the input of an administrator or by receiving the degree of object-keyword association, determined by an external system, via a network or storage medium.

Since the embodiments of FIGS. 6 to 8 have been described above, redundant descriptions will be omitted. However, the process of step S610 of FIGS. 6 and 8 is substantially the same as the process of step S1310 of FIG. 13. Accordingly, when the process of step S1330 is performed, the process of step S610 may not be performed again and the result of step S1310 may be reused even when the embodiments of FIGS. 6 to 8 are used.

In step S1340, the controller 320 stores the degree of basic language unit-keyword association corresponding to each pair of a language unit and a representative attribute keyword in the storage 330 by using an association weight corresponding to a pair of the representative attribute keyword and a subordinate keyword and the degree of basic language unit-subordinate keyword association degree corresponding to a pair of the language unit and the subordinate keyword. The process of step S1340 may be performed according to, e.g., the input of an administrator or the embodiments of any one or more of FIGS. 15 to 17.

Before or during the process of step S1340, the subordinate keyword needs to be determined, the association weight corresponding to the pair of the representative attribute keyword and the subordinate keyword needs to be determined, and the degree of basic language unit-subordinate keyword association degree corresponding to the pair of the language unit and the subordinate keyword needs to be determined.

The subordinate keyword used in the process of step S1340 may be determined through the performance of step S620 during the process of step S1330. In this case, the subordinate keyword of step S620 may be used in step S1340. Unless the subordinate keyword is determined in step S1330, the subordinate keyword may be determined through step S620 of FIG. 6 and a process identical or similar to its previous process.

The association weight used in the process of step S1340 may be determined through the performance of step S630 during the process of step S1330. In this case, the association weight of step S630 may be used in step S1340. Unless the association weight is determined in step S1330, the association weight may be determined step S630 of FIG. 6 and a process identical or similar to its previous process.

The degree of basic language unit-subordinate keyword association degree may be calculated by, e.g., taking into account the frequency at which the language unit and the subordinate keyword appear in the same context or similar contexts.

In the following, in descriptions of FIGS. 15 to 17, an example of obtaining the degree of basic language unit-keyword association $v_{3,2}$ between language unit $C_2$ and representative attribute keyword $k_3$ is described. For example, it is assumed that the subordinate keywords of the representative attribute keyword $k_3$ are $B3_1$ to $B3_{50}$. For the language unit, the representative attribute keyword, and the degree of basic language unit-keyword association, reference is made to the example described above with reference to FIG. 11. The degree of basic language unit-subordinate keyword association degree corresponding to a pair of language unit $C_j$ and subordinate keyword $B_{gh}$ is represented by $x_{j,h}$, an association weight corresponding to a pair of the subordinate keyword $B_{gh}$ and representative attribute keyword $k_g$ is represented by $y_{g,h}$. The adjusted degree of language unit-subordinate keyword association degree corresponding to the combination of language unit $C_j$, representative attribute keyword $k_g$, and subordinate keyword $B_{gh}$ is represented by $x_{j,g,h}$.

Figure 15:
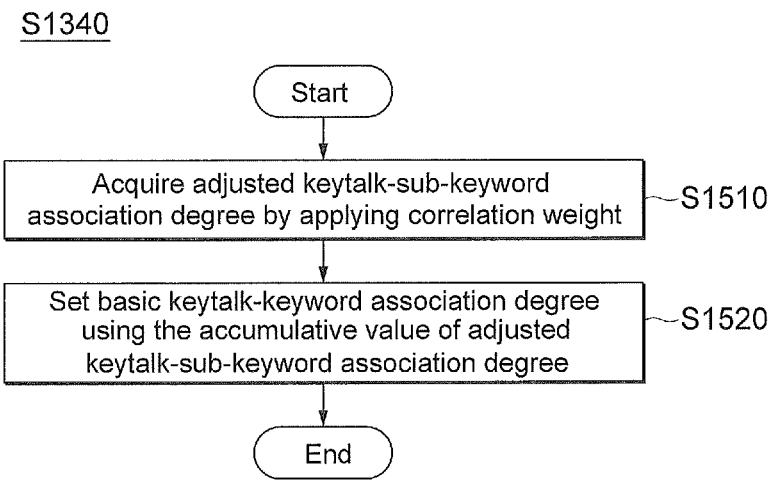
FIG. 15 is a detailed flowchart illustrating some of the steps of FIG. 13 according to an embodiment.

FIG. 15 is a detailed flowchart illustrating step S1340 according to a first embodiment of the present disclosure.

Referring to FIG. 15, in step S1510, the controller 320 obtains the adjusted degree of language unit-subordinate keyword association degree by applying the association weight to the degree of basic language unit-subordinate keyword association.

In step S1510, for each language unit-subordinate keyword pair, the controller 320 may obtain the adjusted degree of language unit-subordinate keyword association degree corresponding to the language unit-subordinate keyword pair for the representative attribute keyword by applying an association weight corresponding to a subordinate keyword-representative attribute keyword pair to the degree of basic language unit-subordinate keyword association degree corresponding to the language unit-subordinate keyword pair.

For example, in order to obtain the adjusted degree of language unit-subordinate keyword association degree between $C_2$ and $B3_4$ corresponding to a pair of subordinate keyword $B3_4$ and representative attribute keyword $k_3$ when a language unit is $C_2$, the controller 320 may obtain the adjusted degree of language unit-subordinate keyword association degree $x_{2,3,4}$ by applying association weight $y_{3,4}$ corresponding to the pair of the subordinate keyword $B3_4$ and the representative attribute keyword $k_3$ to the degree of basic language unit-subordinate keyword association degree $x_{2,4}$ corresponding to a pair of the language unit $C_2$ and the subordinate keyword $B3_4$.

In particular, a method for applying an association weight may be a method for multiplying the degree of basic language unit-subordinate keyword association degree $x_{2,4}$ by the association weight $y_{3,4}$ corresponding to the pair of the subordinate keyword $B3_4$ and the representative attribute keyword $k_3$. For example, in order to obtain the adjusted degree of language unit-subordinate keyword association degree $x_{2,3,4}$ between $C_2$ and $B3_4$ corresponding to a pair of the subordinate keyword $B3_4$ and the representative attribute keyword $k_3$ when the language unit is $C_2$, the controller 320 may obtain the adjusted degree of language unit-subordinate keyword association degree $x_{2,3,4}$ by using value $x_{2,4} \times y_{3,4}$ obtained by multiplying the pair of the language unit $C_2$ and the subordinate keyword $B3_4$ corresponding to the degree of basic language unit-subordinate keyword association degree $x_{2,4}$ by association weight $y_{3,4}$ corresponding to the pair of the subordinate keyword $B3_4$ and the representative attribute keyword $k_3$. In another embodiment, the controller 320 may obtain the adjusted degree of language unit-subordinate keyword association degree $x_{2,3,4}$ by using function $f(x_{2,4}, y_{3,4})$ based on another calculation/utilization method adapted to allow the adjusted degree of language unit-subordinate keyword association degree $x_{2,3,4}$ to have a positive correlation with $x_{2,4}$ and $y_{3,4}$ in place of the multiplication. In addition, both a method for using $(x_{2,4} \times v_{3,4})$ as the adjusted degree of language unit-subordinate keyword association degree $x_{2,3,4}$ and a method for applying another factor-based correction to $(x_{2,4} \times v_{3,4})$ and then using a resulting value as the adjusted degree of language unit-subordinate keyword association degree $x_{2,3,4}$ may be used.

In step S1520, the controller 320 may set the degree of basic language unit-keyword association by using the cumulative value of the adjusted degrees of language unit-subordinate keyword association degree $x_{2,3,f}$ between the language unit $C_2$ and the representative attribute keyword $k_3$. In other words, the degree of basic language unit-keyword association between the language unit $C_2$ and the representative attribute keyword $k_3$ may be $\Sigma_{f=1}^{50} x_{2,3,f}$. In other words, the degree of basic language unit-keyword association between the language unit $C_2$ and the representative attribute keyword $k_3$ may be obtained by obtaining the degrees of basic language unit-subordinate keyword association degree $x_{2,f}$ with language unit $C_2$ for subordinate keywords $B3_1$ to $B3_{50}$, obtaining $x_{2,3,f}$ by incorporating an association weight $y_{3,f}$ for the corresponding subordinate keyword to each of the degrees of basic language unit-subordinate keyword association degree $x_{2,f}$ and then accumulating $x_{2,3,f}$. According to another embodiment, the degree of basic language unit-keyword association between the language unit $C_2$ and the representative attribute keyword $k_3$ may be a value obtained by applying another factor-based correction to $\Sigma_{f=1}^{50} x_{2,3,f}$. According to another embodiment, the degree of basic language unit-keyword association between the language unit $C_2$ and the representative attribute keyword $k_3$ may be a value having a positive correlation with $\Sigma_{f=1}^{50} x_{2,3,f}$. In this case, it is assumed that subordinate keywords connected to one representative attribute keyword are 50 in number. However, when the number of subordinate keywords connected to a representative attribute keyword varies, the cumulative range of f may become a different value, other than 50, in the formula.

Figure 16:
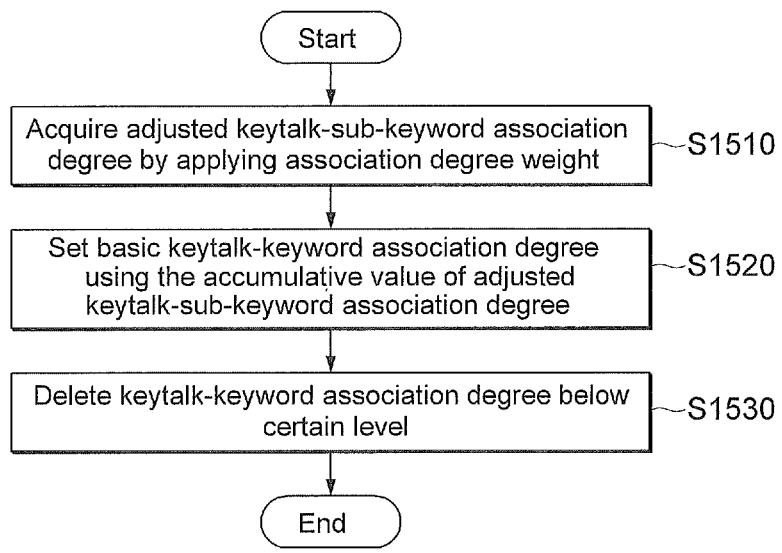
FIG. 16 is a detailed flowchart illustrating some of the steps of FIG. 13 according to another embodiment.

FIG. 16 is a detailed flowchart illustrating step S1340 according to another embodiment.

Since the processes of steps S1510 and 1520 of FIG. 16 are the same as the processes described with reference to FIG. 15, redundant descriptions will be omitted.

Referring to FIG. 16, in step S1530, the controller 320 may delete the degree of basic language unit-keyword association for at least one representative keyword, for which the degree of basic language unit-keyword association for a pair of the language unit and the corresponding representative keyword is equal or lower than the reference degree of basic language unit-keyword association, among representative keywords corresponding to a specific language unit. Representative keywords corresponding to a specific language unit refer to keywords for which the degree of basic language unit-keyword association have been set in the relation to the specific language unit. The reference degree of basic language unit-keyword association may be set in advance. According to another embodiment, the reference degree of basic language unit-keyword association may be set using the average value of the degree of basic language unit-keyword association corresponding to the specific language unit, or may be set using the degree of basic language unit-keyword association at a specific order position when the degree of basic language unit-keyword association corresponding to the specific language unit are arranged in the order of their size. Another specific value having a positive correlation with the degree of basic language unit-keyword association corresponding to the specific language unit may become the reference degree of basic language unit-keyword association. The reference degree of basic language unit-keyword association may vary depending on a language unit, and may be the same for all language units. The deletion of the degree of basic language unit-keyword association means that there is no degree of association between a language unit and a representative keyword. The controller 320 may set the degree of association to 0. Alternatively, the controller 320 may delete the degree of basic language unit-keyword association in such a manner as to delete information about the degree of basic language unit-keyword association of a pair of the language unit and the corresponding representative keyword in a list (which may be replaced with an array, or another data structure) illustrating the degrees of basic language unit-keyword association. There may be used another method for adding information indicating that the degree of basic language unit-keyword association has been deleted (or an associative relationship has been deleted).

Through the process of step S1530, the degree of basic language unit-keyword association having a relatively slight degree of association is deleted (i.e., a setting is made such that there is no degree of association), and thus excessively complicated calculation may be prevented from being performed or an associative relationship substantially meaningless to a user/administrator may be prevented from being displayed.

Figure 17:
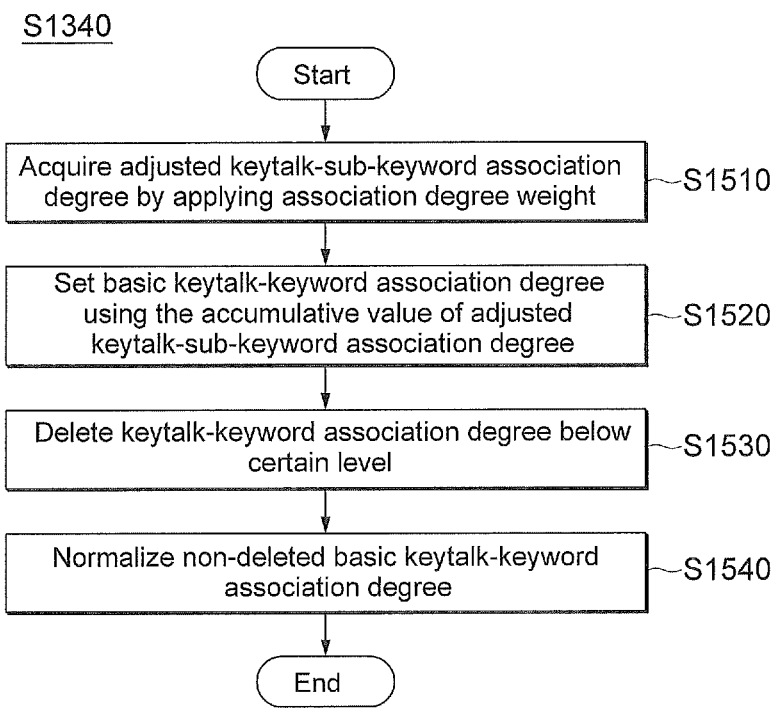
FIG. 17 is a detailed flowchart illustrating some of the steps of FIG. 13 according to another embodiment.

FIG. 17 is a detailed flowchart illustrating step S1340 according to still another embodiment.

Since the processes of steps S1510 and S1520 of FIG. 17 are the same as the processes described with reference to FIG. 15, redundant descriptions will be omitted. In addition, since the process of step S1530 of FIG. 17 is the same as the processes described with reference to FIG. 16, a redundant description will be omitted.

In step S1540, the controller 320 may normalize the degree of basic language unit-keyword association which have not been deleted and remain. For example, in order to include the average value of the degrees of basic language unit-keyword association, stored in connection with a specific representative attribute keyword, in a specific range, the degree of basic language unit-keyword association stored in connection with the specific representative attribute keyword may be increased or decreased by multiply the degree of basic language unit-keyword association by a predetermined coefficient. For example, in order to include the total sum of the degree of basic language unit-keyword association stored in connection with a specific representative attribute keyword in a specific range, the degree of basic language unit-keyword association stored in connection with the specific representative attribute keyword may be increased or decreased by multiplying the degree of basic language unit-keyword association by a predetermined coefficient. In other words, appropriate adjustment may be performed to prevent a case where only a specific representative attribute keyword is recommended/used or the specific representative attribute keyword is rarely used even when any language unit is selected because the degree of basic language unit-keyword association having a high value is concentrated on the specific representative attribute keyword.

According to another embodiment, in step S1540, the controller 320 may perform normalizing by adding a predetermined coefficient to the degree of basic language unit-keyword association or applying a combination with an arithmetic operation, such as a log operation, an exponential operation, or the like in place of multiplying them by the predetermined coefficient. According to still another embodiment, the controller 320 may perform normalizing in such a manner as to decrease only the degree of basic language unit-keyword association equal to or higher than a specific reference value or increase only the degree of basic language unit-keyword association equal to or lower than a specific reference value.

In addition, according to another embodiment, in step S1540, the controller 320 may perform normalization in order to include the average value (or the total sum) of the degree of basic language unit-keyword association stored in connection with a specific language unit in a specific range.

There may be possible a modified embodiment in which step S1530 is omitted in the process of FIG. 17 and the normalization of the degree of basic language unit-keyword association is performed.

In step S1350, the communication unit 310 obtains a received language unit by receiving the received language unit from the terminal 200, and transmits the received language unit to the controller 320.

The received language unit is a language unit which is received by the terminal 200 from a search user. The terminal 200 may convert a voice input into an electrical signal (a voice signal), and may transmit information to the provision apparatus 300. The controller 320 of the item recommendation management apparatus 300 may convert the voice signal into a text by analyzing the voice signal, and may match the resulting text to a language unit. In addition, the controller 320 may analyze the intonation, pitch, tempo, respiration state, etc. of a voice by analyzing the voice signal, and may use analysis results as contextual information.

According to another embodiment, the terminal 200 may convert the voice input into a text, and may transmit the text to the item recommendation management apparatus 300. The terminal 200 may analyze the intonation, pitch, tempo, respiration state of a voice, etc., and may transmit analysis information to the item recommendation management apparatus 300. The item recommendation management apparatus 300 may use the analysis information as a type of contextual information.

In step S1360, the controller 320 obtains the degree of language unit-object association corresponding to a pair of the received language unit and each object item by using the object-keyword association degree and the degree of basic language unit-keyword association. The process of step S1360 may be performed according to the method for step S540 of FIG. 9 or the method for FIG. 12. The same descriptions will be omitted.

In step S1370, the controller 320 may provide an object item according to the degree of language unit-object association corresponding to the received language unit. The process of step S1370 may be performed in the same manner as the process of step S550. The same descriptions will be omitted.

Figure 14:
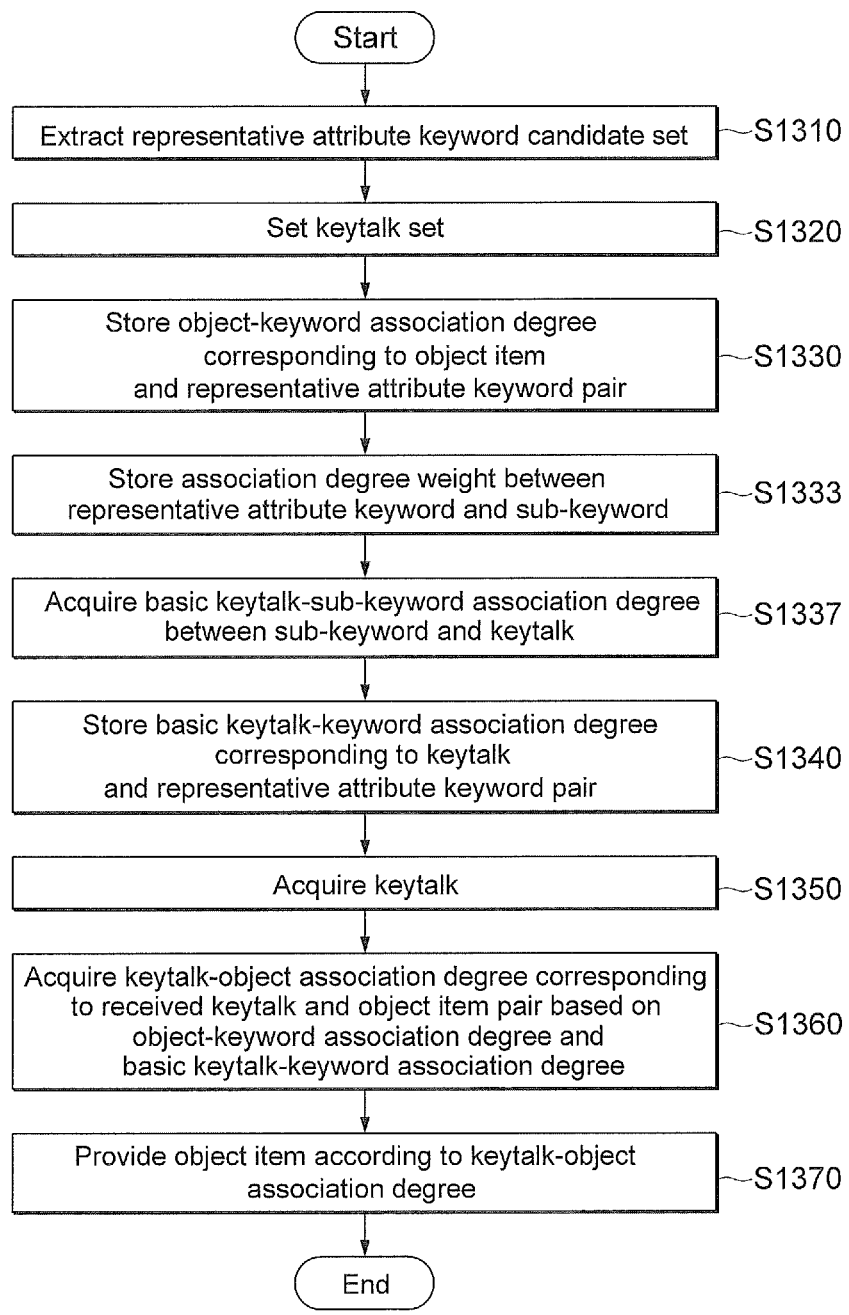
FIG. 14 is a flowchart illustrating a process of managing item recommendation according to another embodiment.

FIG. 14 is a flowchart illustrating a process of providing information according to still another embodiment.

Since steps 1310, 1320, 1330, 1340, 1350, 1360 and 1370 of FIG. 14 are the same as steps 1310, 1320, 1330, 1340, 1350, 1360 and 1370 of FIG. 13, the same description will not be repeated.

Step S1333 added to FIG. 14 may be performed at any time after a representative attribute keyword and a subordinate keyword have been determined. For example, step S1333 may be performed at the same time as/in parallel with step S1330, or may be performed during step S1330.

In step S1333, the controller 320 stores an association weight between the representative attribute keyword and the subordinate keyword. In the case where the process of setting an association weight is not performed in step S1330, an association weight between the representative attribute keyword and the subordinate keyword may be set through a process identical or similar to the process of step S630 of FIG. 6. According to another embodiment, the controller 320 may store an association weight between the representative attribute keyword and the subordinate keyword in such a manner as to retrieve the association weight set in step S1330.

In step S1337, the controller 320 obtains the degree of basic language unit-subordinate keyword association degree between the subordinate keyword and the language unit.

The controller 320 may determine the degree of association between the language unit and the subordinate keyword, e.g., by taking into account the frequency at which the subordinate keyword appears in a context identical or similar to a context in which the language unit appears. For example, words appearing in the vicinity of keyword A in a specific sentence may be viewed as appearing in the vicinity of words associated with the keyword A in other documents.

"I went on a trip after making a hard decision, but it was July and, thus, the weather was so hot that I suffered."

"I went on a trip after making a hard decision, but it was July and, thus, the weather was so humid that I suffered."

Referring to the above two sentences, the word "hot" is replaced with the word "humid" in the same context. The controller 320 may infer that "hot" and "humid" are associated words.

"I went on a trip after making a hard decision, but it was July and, thus, the weather was so hot that I suffered."

"I went on vacation after making a hard decision, but it was July and, thus, the weather was so hot that I suffered."

In the same manner, the controller 320 may infer from the above two sentences that "trip" and "vacation" are associated words.

"I went on a trip after making a hard decision, but it was July and, thus, the weather was so hot that I suffered."

"I went on a trip after making a hard decision, but it was August and, thus, the weather was so hot that I suffered."

In the same manner, the controller 320 may infer that "July" and "August" are associated words.

The controller 320 may stores information in which "hot" and "humid" are associated words, "July" and "August" are associated words, and "trip" and "vacation" are associated words via previously collected documents. Then, it is assumed that the following sentences are collected.

"I went on vacation after making a hard decision, but it was July and, thus, the weather was so hot that I suffered."

"I went on a trip after making a hard decision, but it was August and, thus, the weather was so hot that I went through hardship."

When the two sentences do not have the same context but it is known that "hot" and "humid" are associated words, "July" and "August" are associated words, and "trip" and "vacation" are associated words, the controller 320 may learn via the above sentences that "suffer" and "hardship" are also associated words.

It may be determined that a keyword pair having a high appearing frequency in the same/similar contexts has a high degree of association. In addition, it is determined that the higher the similarity between contexts in which two keywords appear is, the higher the degree of association between the two keywords is. The controller 320 may increase the accuracy of the determination of the degrees of association between keywords in such a manner as to set the degrees of association keywords by performing learning by using collected documents and then setting the degrees of association between keywords appearing in a corresponding sentence by using the set degrees of association between keywords and the context of the sentence.

As similar learning methods, Neural Net Language Model (NNLM), Recurrent Neural Net Language Model (RNNLM), word2vec, skipgram, and Continuous Bag-of-Words (CBOW) methods are known. In particular, when the word2vec method is used, the word2vec method may map individual keywords to vectors by performing learning by using documents, and may determine the similarity between two keywords through the cosine similarity computation of two vectors.

Figure 20:
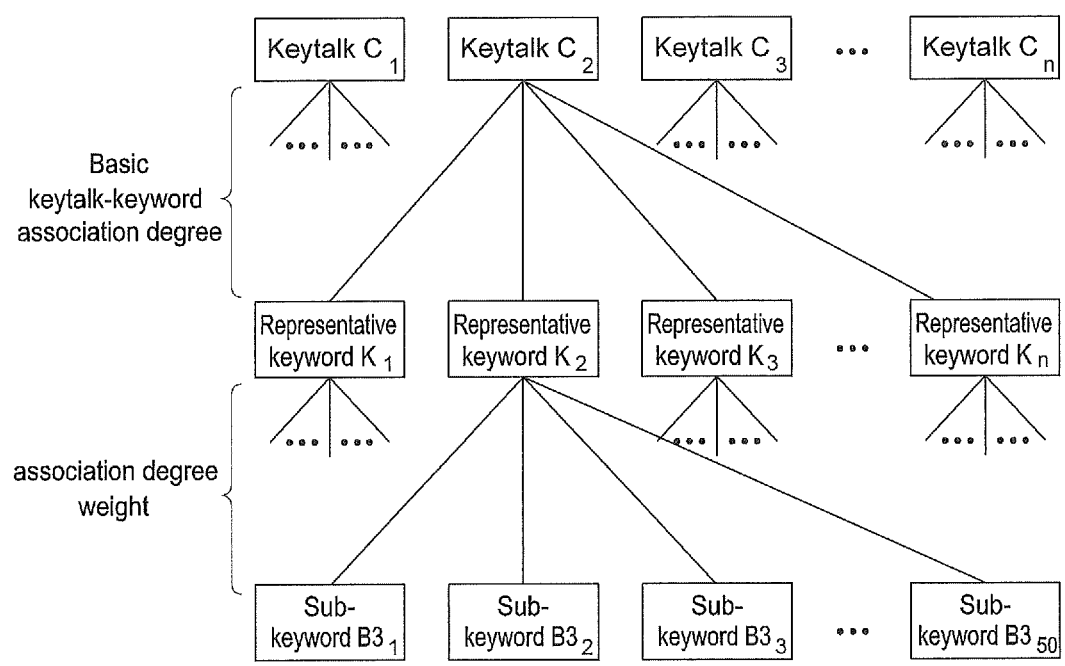
FIG. 20 is a diagram illustrating a term hierarchy according to an embodiment.

FIG. 20 is a view of a terminology hierarchy according to an embodiment.

Once the process of FIG. 13 or 14 has been completed, there are set the hierarchical relationship between language units $C_1$ to $C_q$, representative attribute keywords $k_1$ to $k_n$, and subordinate keywords $BX_1$ to $BX_{50}$.

The degree of basic language unit-keyword are set between the language units and the representative attribute keywords, and association weights are set between the representative attribute keywords and the subordinate keywords. Using this hierarchical relationship, the controller 320 may perform the operation of recommending an appropriate object according to a language unit, the operation of selecting a new language unit candidate, or the like. In addition, the hierarchical relationship of FIG. 20 may be amended or improved by learning through the repetition of the process of FIG. 13 or 14, with new data being incorporated into the hierarchical relationship.

FIG. 21 is an exemplary view illustrating major language units for each language unit list based on a language unit associated with a selected item according to an embodiment.

Referring to FIG. 21, on the basis of the language unit associated with the selected item, major language units for each language unit list are analyzed by word2vec, and the analyzed result is mapped in two dimensions using a dimension reduction scheme. On the basis of the language unit associated with the item selected by the user, the language units are arranged and displayed in descending order of an average degree of association with the selected item for each language unit list (e.g., user's response/atmosphere/genre characteristics).

As illustrated in FIG. 21, for example, in the "user's response" language unit list, "want to eat" has the highest average degree of association with the selected item, followed by "hungry", and followed by "want to watch".

In addition, in the 'atmosphere' language unit list, "cute" has the highest average degree of association with the selected item, followed by "memory", and followed by "ordinary".

In addition, in the "genre characteristics" language unit list, "complex" has the highest average degree of association with the selected item, followed by "popular", and followed by "refine".

FIG. 22 is an exemplary view illustrating a main language unit for each language unit list based on a language unit associated with a selected item according to another embodiment.

Referring to FIG. 22, on the basis of the language unit associated with the selected item, major language units for each language unit list are analyzed by word2vec, and the analyzed result is mapped in two dimensions using a dimension reduction scheme. On the basis of the language unit associated with the item selected by the user, the language units are arranged and displayed in descending order of an average degree of association with the selected item for each language unit list (e.g., user's response/atmosphere/genre characteristics).

As illustrated in FIG. 22, for example, in the "cast" language unit list, "cute" has the highest average degree of association with the selected item, followed by "adorable", and followed by "bright smile".

In addition, in the 'atmosphere' language unit list, "memory" has the highest average degree of association with the selected item, followed by "cute", and followed by "exciting".

In addition, in the "user's response" language unit list, "want to watch" has the highest average degree of association with the selected item, followed by "thankful", and followed by "crazy".

In addition, in the "genre characteristics" language unit list, "trouble" has the highest average degree of association with the selected item, followed by "complex", and followed by "quality".

Figure 23:
FIGS. 23 and 24 are exemplary views illustrating a reference average degree of association of major language units for each list according to an embodiment.
Figure 24:
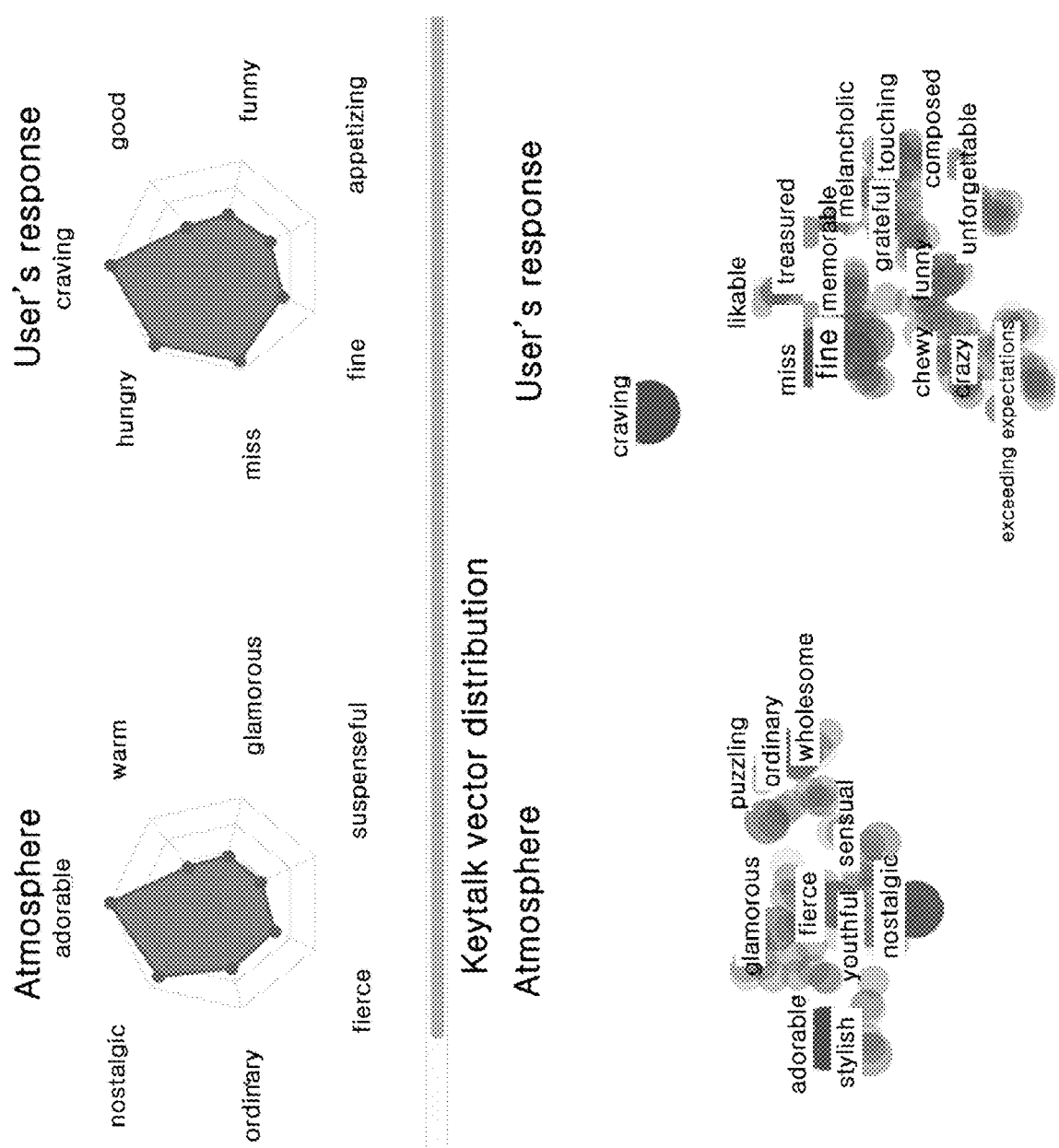

FIGS. 23 and 24 are exemplary views illustrating a reference average degree of association of major language units for each list according to an embodiment.

Referring to FIGS. 23 and 24, charts are prepared based on an average degree of association corresponding to each language unit list. That is, average degrees of association of major language units for each list are analyzed by word2vec, and the analyzed result is mapped in two dimensions using a dimension reduction scheme. In such a case, a circle with a dark color or a large size corresponds to a keyword that is more highly associated with the selected item, and keywords at similar locations are keywords with a high degree of similarity (similar to each other in vector position).

In FIGS. 23 and 24, upper charts are web charts illustrating graphs of degrees of association of language units having high degrees of association, but embodiments are not limited thereto, and they are not necessarily web charts. In addition, lower charts are scatter charts, which are a kind of one chart.

Figure 25:
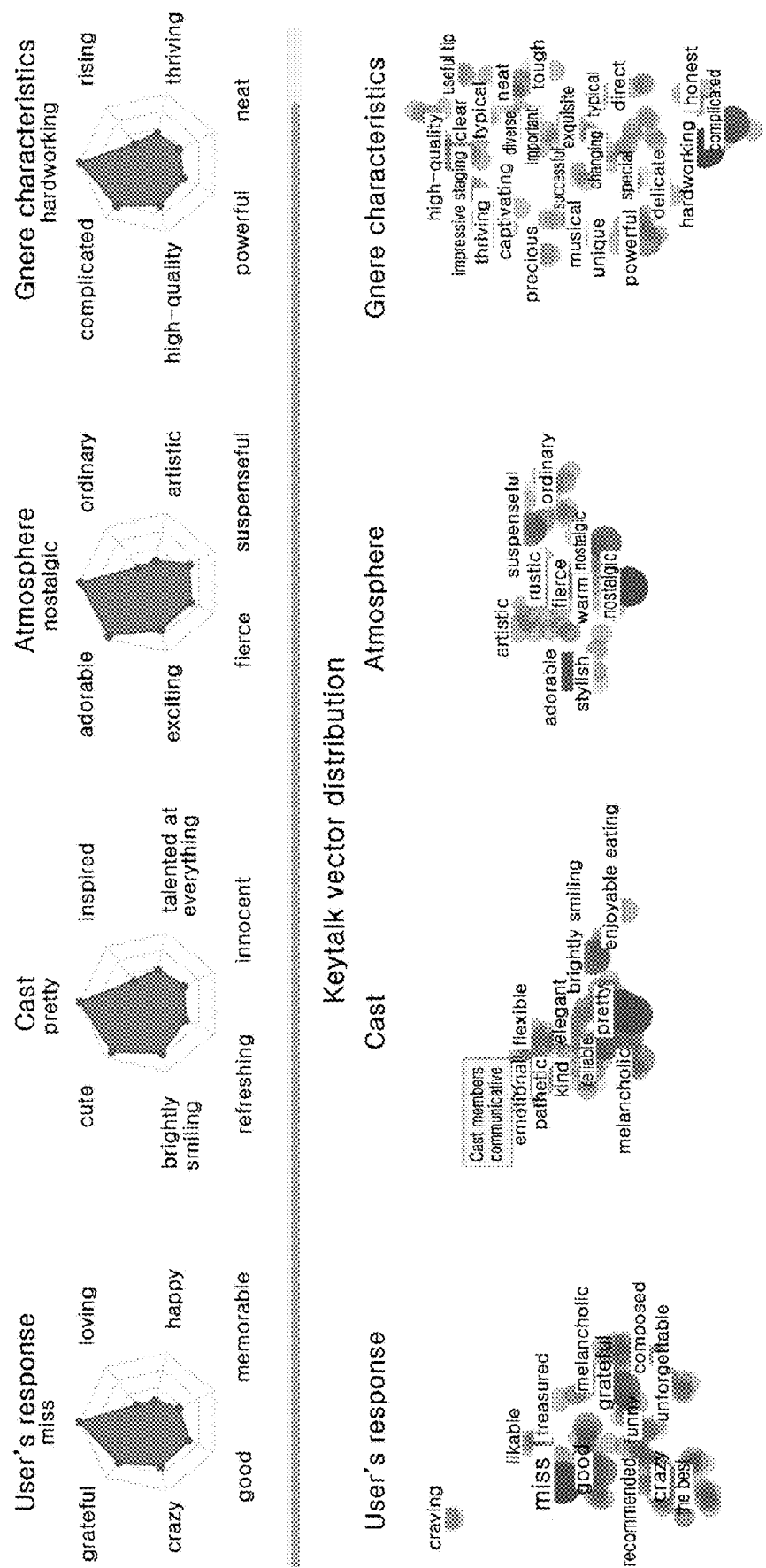
FIG. 25 is an exemplary view illustrating a reference average degree of association of major language units for each list according to another embodiment.

FIG. 25 is an exemplary view illustrating a reference average degree of association of major language units for each list according to another embodiment.

Referring to FIG. 25, charts are prepared based on an average degree of association corresponding to each language unit list. That is, average degrees of association of major language units for each list are analyzed by word2vec, and the analyzed result is mapped in two dimensions using a dimension reduction scheme. In such a case, a circle with a dark color or a large size corresponds to a keyword that is more highly associated with the selected item, and keywords at similar locations are keywords with a high degree of similarity (similar to each other in vector position).

In FIG. 25, upper charts are web charts illustrating graphs of degrees of association of language units having high degrees of association, but embodiments are not limited thereto, and they are not necessarily web charts. In addition, lower charts are scatter charts, which are a kind of one chart.

Figure 26:
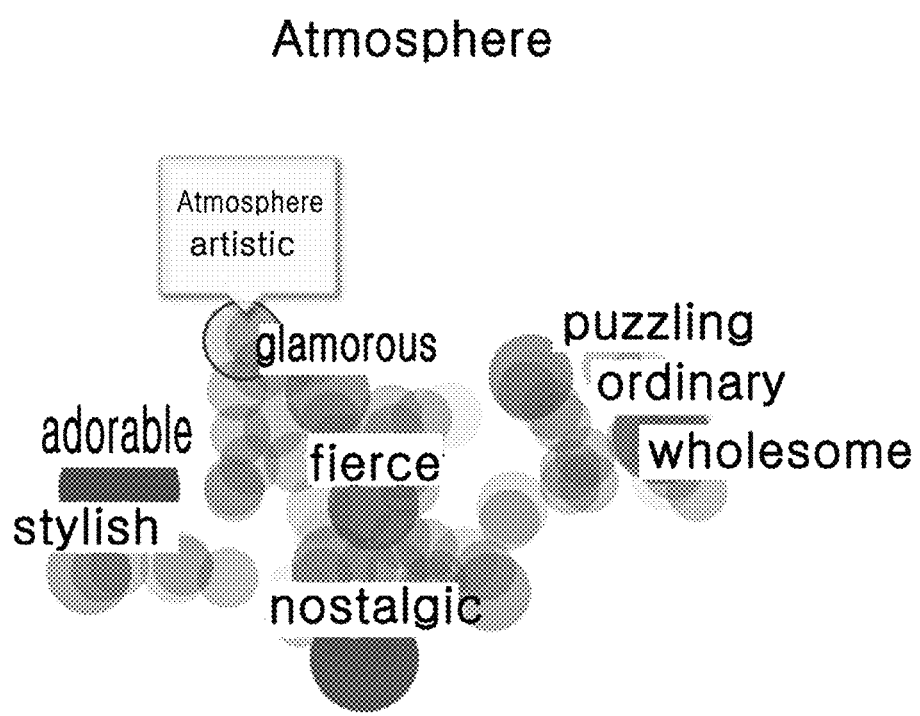
FIGS. 26 and 27 are exemplary diagrams illustrating keywords and keyword categories of major language units for each list according to an embodiment.
Figure 27:
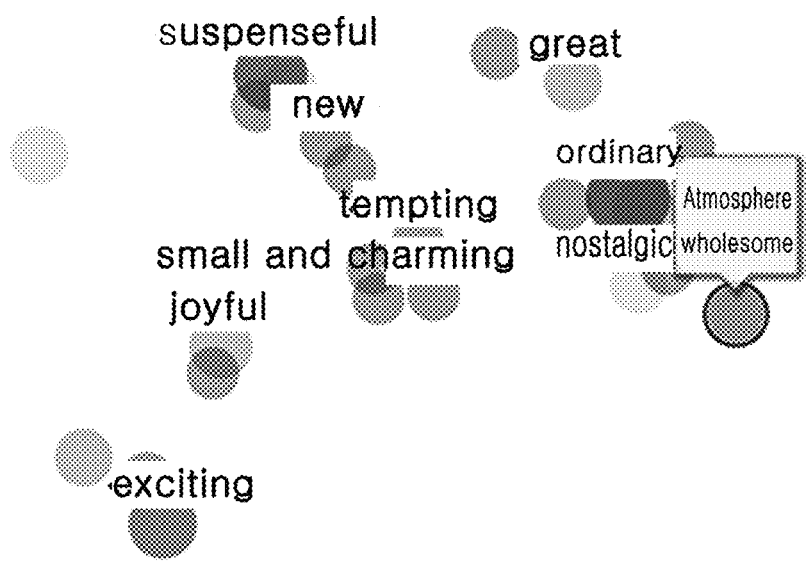

FIGS. 26 and 27 are exemplary diagrams illustrating keywords and keyword categories of major language units for each list according to an embodiment.

In FIGS. 26 and 27, the chart is a scatter chart, a kind of a one-chart chart, and may be zoomed in and out. In the chart illustrated in FIGS. 26 and 27, regardless of the zoom-in/zoom-out state, when a mouse turns on (or other, corresponding scheme) each circle, corresponding keyword+keyword list is displayed. FIG. 27 is an exemplary view enlarging vicinity of "ordinary" in FIG. 26. In such a case, a circle with a dark color or a large size is a keyword that is more highly associated with the selected item, and keywords at similar locations are keywords with a high degree of similarity (similar to each other in vector position).

Figure 28:
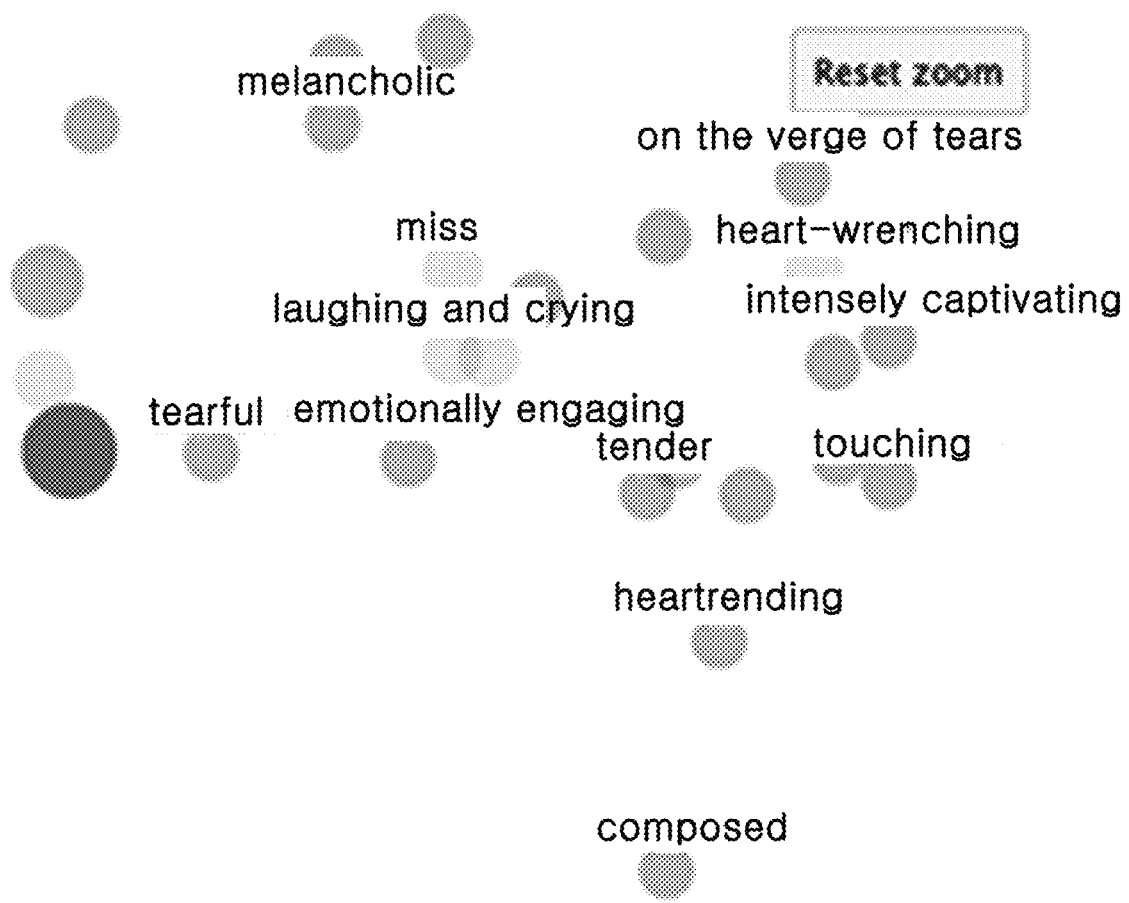
FIG. 28 is an exemplary view illustrating keywords and keyword categories of major language units for each list according to another embodiment.

FIG. 28 is an exemplary view illustrating keywords and keyword categories of major language units for each list according to another embodiment.

In FIG. 28, the chart is a scatter chart, a kind of a one-chart chart, and may be zoomed in and out. In the chart illustrated in FIG. 28, regardless of the zoom-in/zoom-out state, when a mouse turns on (or other, corresponding scheme) each circle, corresponding keyword+keyword list is displayed. In such a case, a circle with a dark color or a large size is a keyword that is more highly associated with the selected item, and keywords at similar locations are keywords with a high degree of similarity (similar to each other in vector position).

Figure 29:
FIG. 29 is an exemplary view illustrating a language unit adjustment interface corresponding to a clicked list according to an embodiment.
Figure 30:
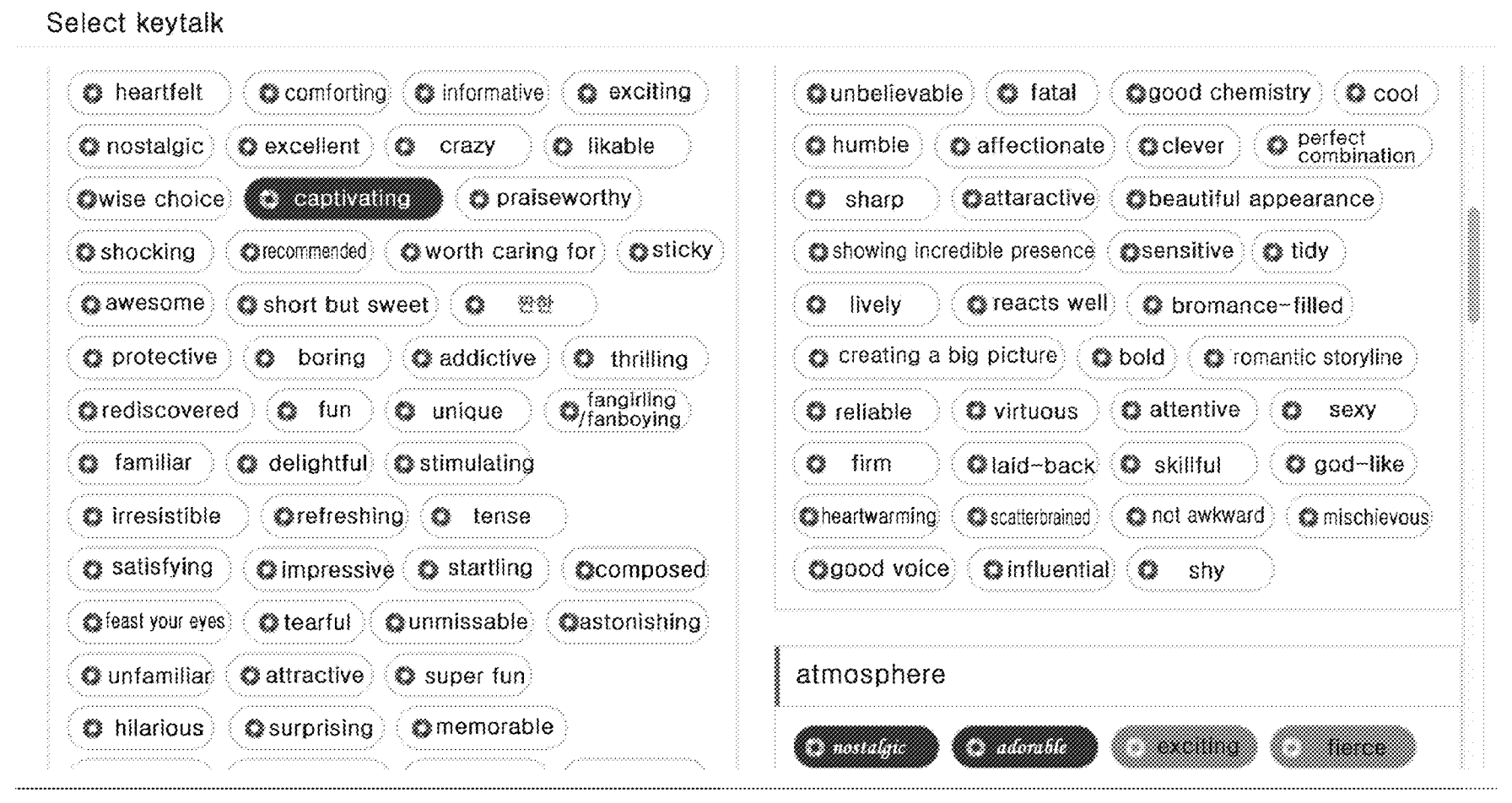

In such a case, when the above-mentioned web chart or one-chart is clicked, a language unit adjustment interface corresponding to the corresponding clicked list is displayed, as illustrated in FIGS. 29 and 30 to be described below.

FIG. 29 is an exemplary view illustrating a language unit adjustment interface corresponding to a clicked list according to an embodiment, and FIG. 30 is an exemplary view illustrating an entire language unit adjustment interface corresponding to a clicked list according to an embodiment.

In FIGS. 29 and 30, for the selected items, initial language unit selection selects "n" number of language units having high average degrees of association with the corresponding items with respect to a certain threshold value. In such a case, the threshold value may be a maximum number or a minimum degree of association.

In addition, already selected language units are dark purple in color, as illustrated, and the background color is blurred as the degree of association decreases, and they are arranged in descending order of the degree of association. In addition to the color brightness scheme, it is also possible to display the degree of association with other schemes, such as brightness/saturation/color/shape in descending order of the degree of association.

In addition, when "select language unit" is clicked in FIG. 30, it is possible to perform add/delete for entire language unit.

Figure 31:
FIG. 31 is an exemplary view illustrating a language unit adjustment interface corresponding to a clicked list according to another embodiment.
Figure 32:
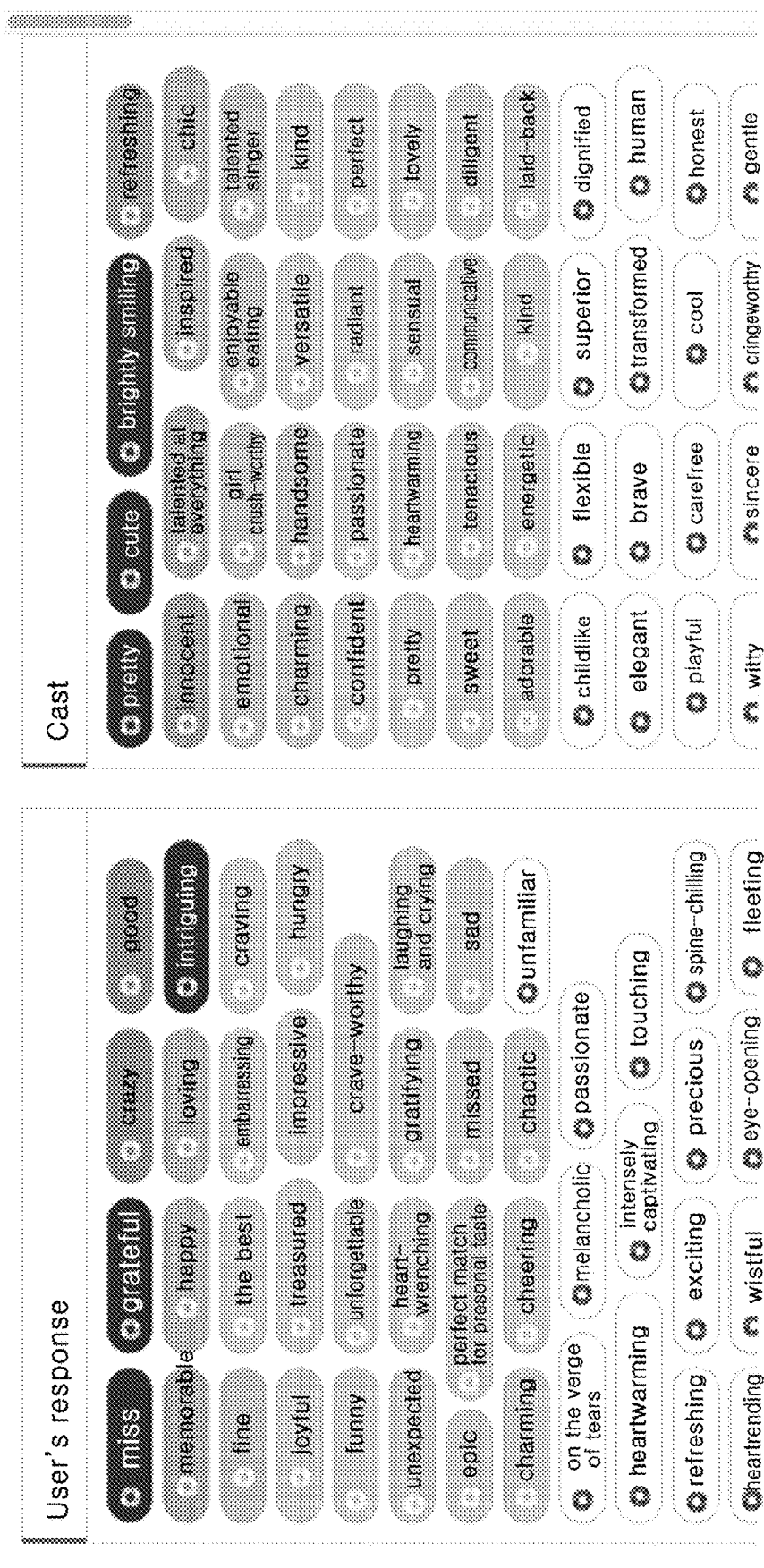
FIG. 32 is an exemplary view illustrating an entire language unit adjustment interface corresponding to a clicked list according to another embodiment.

FIG. 31 is an exemplary view illustrating a language unit adjustment interface corresponding to a clicked list according to another embodiment, and FIG. 32 is an exemplary view illustrating an entire language unit adjustment interface corresponding to a clicked list according to another embodiment.

In FIGS. 31 and 32, for the selected items, initial language unit selection selects "n" number of language units having high average degrees of association with the corresponding items with respect to a certain threshold value. In such a case, the threshold value may be a maximum number or a minimum degree of association.

In addition, already selected language units are dark purple in color, as illustrated, and the background color is blurred as the degree of association decreases, and they are arranged in descending order of the degree of association. In addition to the color brightness scheme, it is also possible to display the degree of association with other schemes, such as brightness/saturation/color/shape in descending order of the degree of association.

In addition, when "select language unit" is clicked in FIG. 30, it is possible to perform add/delete for entire language unit.

Figure 33:
FIG. 33 is an exemplary view illustrating a button for adjusting weights of the language units according to an embodiment.
Figure 34:
FIG. 34 is an exemplary view illustrating a button for adjusting weights of the language units according to another embodiment.

FIG. 33 is an exemplary view illustrating a button for adjusting weights of the language units according to an embodiment, and FIG. 34 is an exemplary view illustrating a button for adjusting weights of the language units according to another embodiment.

In FIGS. 33 and 34, it is possible to adjust or delete a weight of a specific item and a degree of association of a language unit.

For example, if an average degree of association between a language unit i and usage items is $AR_i$, and a degree of association between a specific item $I_j$ and the language unit i is $R_{ij}$, a recommendation ranking of the item $I_j$ may be represented by $$\sum_{i=0}^{k-1} f(R_{ij}, R_i),$$

where k is the number of language units selected in 1. In such a case, $f(x, y)$ may be, for example, multiplication, or another operation having a positive correlation with x and y, and other operations, other than a simple f(x, y) accumulation, that have a positive correlation with each value of $f(x, y)$ may also be used.

A weight of the language unit of FIGS. 33 and 34 is further reflected in the obtained recommendation ranking of the item $I_j$. That is, the recommendation ranking of the item $I_j$ is multiplied by the weight of the language unit. Accordingly, if the weight of the language unit is $w_i$, from among $w_0$ to $w_{k-1}$, the recommendation ranking of the item $I_j$ in which the weight is reflected becomes $$\sum_{i=0}^{k-1} f(R_{ij} * w_i, R_i).$$

Accordingly, the administrator may recommend items, in descending order of the degree of association between the language unit and the usage history, by reflecting the weight of the language unit of the user 400. In addition, the administrator may recommend items by using the degree of association between the language unit and the usage history and by reflecting the weight of the language unit of the user 400. In such a case, all the weights of the language units of the user 400 may be evaluated as having equal values, or the recent weights may be evaluated as having higher values. That is, the value may be evaluated differently according to the recentness of the weight of the language unit of the user 400. The value of the weight of the language unit of the user 400 may be evaluated, for example, in units of seconds/minutes/hours, or in units of days/months/years.

In addition, normalization may be added to $$\sum_{i=0}^{k-1} f(R_{ij} * w_i, R_i),$$

which is the recommendation ranking of the item $I_j$ in which the weight of the language unit is reflected. For example, if the weight of $w_0$ is normalized, normalization may be added as $$w_o \Big/ \sum_{i=0}^{k-L} w_j,$$

Figure 35:
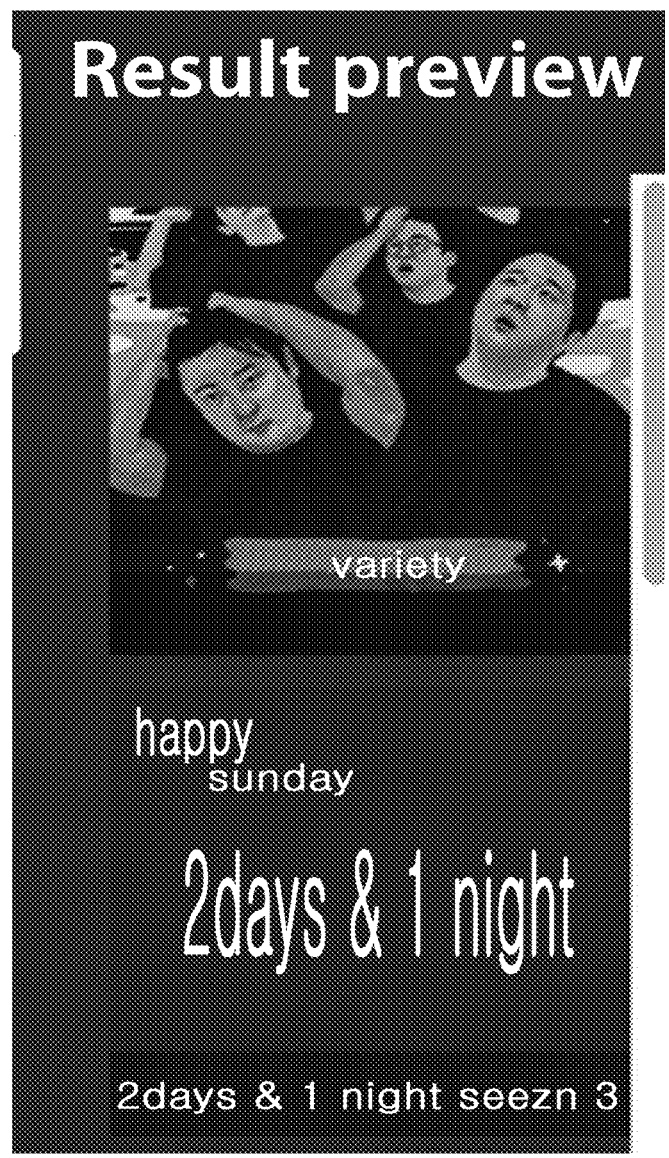
FIG. 35 is an exemplary view illustrating recommendation items recommended by a system of managing item recommendation using a degree of association between language units and usage history according to an embodiment.

The recommendation items recommended by the system of managing item recommendation using the degree of association between the language unit and the usage history according to the present disclosure are as illustrated in FIG. 35.

In the method for managing item recommendation using the degree of association between the language unit and the usage history according to the present disclosure as described above, it is to be understood that individual blocks of the flowcharts and/or combinations of the blocks of the flowcharts may be performed by computer program instructions. Since it is possible to install these computer program instructions on a general-purpose computer, a special computer, or the processor of a programmable data processing apparatus, the instructions executed through the computer or the processor of the programmable data processing apparatus generate a means for performing functions which are described in the blocks of the flowcharts. In addition, since it is possible to store these computer program instructions in computer-usable or computer-readable memory that may be oriented to a computer or some other programmable data processing apparatus in order to implement functions in a specific manner, it is possible to manufacture products in which instructions stored in computer-usable or computer-readable memory include means for performing functions described in the blocks of flowcharts. Moreover, since it is possible to install computer program instructions on a computer or another programmable data processing apparatus, instructions for performing a series of operational steps on the computer or the programmable data processing apparatus, generating processes executed by the computer and operating the computer or the programmable data processing apparatus may provide steps for performing functions described in the blocks of flowcharts.

In addition, each block may refer to part of a module, a segment, or code including one or more executable instructions for performing one or more specific logical functions. Moreover, it should be noted that in some alternative embodiments, functions described in blocks may occur out of order. For example, two successive blocks may be actually performed at the same time, or sometimes may be performed in reverse order according to relevant functions.

In this case, the term "unit" used herein refers to a software or hardware component, such as an FPGA or ASIC, which performs a function. However, the term "unit" is not limited to a software or hardware component. The unit may be configured to be stored in an addressable storage medium, or may be configure to run one or more processors. For example, the unit may include components, such as software components, object-oriented software components, class components and task components, processes, functions, attributes, procedures, subroutines, segments of program codes, drivers, firmware, microcode, circuits, data, databases, data structures, tables, arrays, and variables. Functions provided by components and units may be combined into a smaller number of components and units, or may be divided into a larger number of components and units. In addition, components and units may be each implemented to run one or more CPUs within a device or security multimedia card.

As described above, the method for managing item recommendation using the degree of association between the language unit and the usage history according to the present disclosure may manage and recommend similar items having high probability of purchase, using a vector model-based reasoning scheme based on a word-to-word association, in consideration of a user's preference, experience, and/or purchase history. In addition, some of the recommendation items to be provided to users of a specific pattern may be adjusted. In addition, recommendation items may be provided to the user according to the recommendation ranking. In addition, keywords may be vectorized by processing them with word2vec or other similar vectorization techniques. In addition, when a web chart or a one-click chart is clicked, language units to be displayed on a language unit adjustment interface may be added or deleted corresponding to the clicked category. In addition, the language unit weight may be adjusted or deleted by using the language unit weight adjustment button.

As set forth hereinabove, according to one or more embodiments of the present disclosure, the method for managing item recommendation using a degree of association between language units and usage history may manage recommendation of similar items having high probability of purchase based on a word-to-word association in consideration of user's history of preference, experience, and/or purchase.

In addition, it is advantageous in that some of the recommendation items to be recommended to users of a specific pattern may be adjusted.

In addition, it is advantageous in that it is possible to provide a recommendation item to the user according to the recommendation ranking.

In addition, it is advantageous in that some of the recommendation items to be provided to users of a specific pattern may be adjusted.

In addition, it is advantageous in that keywords may be vectorized by processing with word2vec or other similar vectorization techniques.

In addition, it is advantageous in that by clicking the web chart or the one chart, language units corresponding to the clicked category, displayed on the language unit adjustment interface may be added or deleted.

In addition, it is advantageous in that the weight of the language unit may be adjusted or deleted by using the button for adjusting weights of the language units.

Meanwhile, although the embodiments of the present disclosure have been disclosed in the present specification and the accompanying drawings and the specific terms have been used, this is intended merely to easily describe the technical spirit of the present disclosure and help to understand the present disclosure, but is not intended to limit the scope of the present disclosure. It will be apparent to those having ordinary knowledge in the art to which the present disclosure pertains that other modified embodiments based on the technical spirit of the present disclosure may be implemented in addition to the disclosed embodiments.

What is claimed is:

1. A method for managing item recommendation based on a degree of association between language units and usage history, by using an apparatus of managing item recommendation, the method comprising:
setting a degree of association between language units and items by a controller of the apparatus of managing item recommendation;
generating, by the controller of the apparatus of managing item recommendation, item selection interface page information for editing an experience item list including experience items;
transmitting, by a communication unit of the apparatus of managing item recommendation, the item selection interface page information to a terminal;
receiving, from the terminal, by the communication unit of the apparatus of managing item recommendation, item selection input information through which an input of item selection from the experience item list is identifiable;
obtaining, by the controller of the apparatus of managing item recommendation, a language unit-association degree pair based on a threshold value, in association with each experience item in the experience item list;
obtaining, by the controller of the apparatus of managing item recommendation, a language unit-list association degree between the experience item list and each language unit, based on the language unit-association degree pair corresponding to the experience item list;
generating, by the controller of the apparatus of managing item recommendation, a recommendation item list based on the language unit-list association degree;
transmitting the recommendation item list to the terminal by the communication unit of the apparatus of managing item recommendation;
generating, by the controller of the apparatus of managing item recommendation, language unit category page information that displays, for each language unit category, language units in descending order of the language unit-list association degree based on a threshold value, in relation to the experience item list; and
transmitting the language unit category page information to the terminal by the communication unit of the apparatus of managing item recommendation.

2. The method for managing item recommendation of claim 1, wherein the language unit category page information further comprises a scatter chart in which for each language unit category, visual indications indicating language units corresponding to the corresponding language unit category are visually displayed in a 2-dimensional vector location according to a pattern of the language units appearing in a document.

3. The method for managing item recommendation of claim 2, wherein the language unit category page information further comprises an interface that displays, for the user, upon reception of an enlargement input from the scatter chart, a scatter chart of similar language units enlarged according to the received enlargement input.

4. The method for managing item recommendation of claim 3, wherein the scatter chart displays, at close locations, visual indications that indicate two language units having similar locations appearing in a document, and distinctively displaying one or more of a size or a display color of the visual indications indicating the language units according to the language unit-list association degree in relation to the experience item list.

5. The method for managing item recommendation of claim 3, wherein the language unit category page information further comprises a graph that, for each language unit category, distinctively represents one or more of a height and an an area of a corresponding visual object according to the language unit-list association degree in relation to the experience item list of the language units corresponding to the corresponding language unit category.

6. The method for managing item recommendation of any one of claims 1 to 5, wherein the language unit category page information is configured to provide, upon selection of an area corresponding to a certain language unit category by a user, an interface for adding a language unit corresponding to the certain language unit category as a language unit corresponding to the experience item list or deleting the language unit from a set of language units corresponding to the experience item list, and
when the controller of the apparatus of managing item recommendation receives an an edit request input through an interface for adding a language unit corresponding to the certain language unit category as a language unit corresponding to the experience item list or deleting the language unit from a set of language units corresponding to the experience item list, the controller adds or deletes the language unit corresponding to the experience item list according to the edit request.

7. The method for managing item recommendation of claim 6, wherein the language unit category page information is configured to provide, upon reception of an input for adjusting a degree of association from a user, an interface for adjusting the language unit-list association degree between the language unit and the experience item list, and
when the controller of the apparatus of managing item recommendation receives an input for adjusting the degree of association from a user or receives a request for adjusting the degree of association through the interface for adjusting the language unit-list association degree between the language unit and the experience item list, the controller adjusts the language unit-list association degree between the language unit and the experience item list according to the request for adjusting the degree of association.

8. The method for managing item recommendation of claim 7, wherein the controller of the apparatus of managing item recommendation generates the recommendation item list by reflecting the addition or deletion of the language unit according to the edit request and transmits the recommendation item list to the terminal, and the controller of the apparatus of managing item recommendation generates the recommendation item list by reflecting the adjustment of the degree of association according to the request for adjusting the degree of association and transmits the recommendation item list to the terminal.

* * * * *